US010883008B2

(12) United States Patent
Ingle et al.

(10) Patent No.: US 10,883,008 B2
(45) Date of Patent: Jan. 5, 2021

(54) INKJET INK SET

(71) Applicant: Hewlett-Packard Development Company, L.P., Spring, TX (US)

(72) Inventors: David Michael Ingle, San Diego, CA (US); Phillip C. Cagle, San Marcos, CA (US); Paul J. Bruinsma, San Diego, CA (US); Howard Doumaux, San Diego, CA (US); Timothy C. Mauldin, San Diego, CA (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 0 days.

(21) Appl. No.: 16/330,318

(22) PCT Filed: Jan. 5, 2018

(86) PCT No.: PCT/US2018/012628
§ 371 (c)(1),
(2) Date: Mar. 4, 2019

(87) PCT Pub. No.: WO2018/144182
PCT Pub. Date: Aug. 9, 2018

(65) Prior Publication Data
US 2019/0225826 A1 Jul. 25, 2019

(30) Foreign Application Priority Data

Jan. 31, 2017 (WO) ............... PCT/US2017/015899
Jan. 31, 2017 (WO) ............... PCT/US2017/015903
Jan. 31, 2017 (WO) ............... PCT/US2017/015907
Apr. 13, 2017 (WO) ............... PCT/US2017/027428
Jul. 27, 2017 (WO) ............... PCT/US2017/044177

(51) Int. Cl.
| | |
|---|---|
| *C09D 11/322* | (2014.01) |
| *C09D 11/107* | (2014.01) |
| *C09D 11/54* | (2014.01) |
| *C09D 11/40* | (2014.01) |
| *B41J 2/01* | (2006.01) |
| *B41M 5/00* | (2006.01) |
| *C09D 11/033* | (2014.01) |
| *C09D 11/037* | (2014.01) |
| *C08K 3/22* | (2006.01) |
| *C08K 9/02* | (2006.01) |
| *C09D 11/326* | (2014.01) |

(52) U.S. Cl.
CPC ............... *C09D 11/322* (2013.01); *B41J 2/01* (2013.01); *B41M 5/0011* (2013.01); *B41M 5/0023* (2013.01); *C09D 11/033* (2013.01); *C09D 11/037* (2013.01); *C09D 11/107* (2013.01); *C09D 11/40* (2013.01); *C09D 11/54* (2013.01); *C08K 3/22* (2013.01); *C08K 9/02* (2013.01); *C08K 2003/2227* (2013.01); *C08K 2003/2241* (2013.01); *C08K 2003/2244* (2013.01); *C08K 2003/2296* (2013.01); *C08K 2201/005* (2013.01); *C09D 11/326* (2013.01)

(58) Field of Classification Search
CPC ............ B41M 5/0023; B41M 5/0011; C09D 11/033; C09D 11/40; C09D 11/107; C09D 11/54
USPC ................................................. 523/160, 161
See application file for complete search history.

(56) References Cited

U.S. PATENT DOCUMENTS

| | | | |
|---|---|---|---|
| 3,437,502 A | 4/1969 | Warner | |
| 4,186,178 A | 1/1980 | Oberlander | |
| 4,495,238 A | 1/1985 | Adiletta | |
| 4,630,076 A * | 12/1986 | Yoshimura | ............. B41J 2/2114 346/98 |
| 5,990,202 A | 11/1999 | Nguyen et al. | |
| 6,184,268 B1 | 2/2001 | Nichols et al. | |
| 6,302,536 B1 | 10/2001 | Sarma et al. | |
| 6,498,202 B1 | 12/2002 | Sun et al. | |
| 6,709,095 B2 | 3/2004 | Sago et al. | |
| 6,779,884 B1 | 8/2004 | Ma et al. | |
| 6,783,580 B2 | 8/2004 | Tyvoll et al. | |
| 6,906,019 B2 | 6/2005 | Nitzan et al. | |

(Continued)

FOREIGN PATENT DOCUMENTS

| | | |
|---|---|---|
| EP | 0728779 | 8/1996 |
| EP | 1403341 | 3/2004 |

(Continued)

OTHER PUBLICATIONS

Disperal®/Dispal® High Purity Dispersible Aluminas, Sasol, Jan. 2003, 10 pages < http://www.sasoltechdata.com/tds/DISPERAL_DISPAL.pdf >.

(Continued)

*Primary Examiner* — Doris L Lee
(74) *Attorney, Agent, or Firm* — HP Inc. Patent Department

(57) ABSTRACT

The present disclosure refers to an inkjet ink set comprising a black ink with a black pigment, a yellow ink with a yellow pigment, a cyan ink with a cyan pigment, a magenta ink with a magenta pigment and a white ink with a white pigment. At least one of the ink further contains a latex binder that is dispersed in the ink vehicle, and that includes a first heteropolymer including two or more aliphatic (meth)acrylate ester monomers or two or more aliphatic (meth)acrylamide monomers; and a second heteropolymer including a cycloaliphatic monomer and an aromatic monomer. The present disclosure refers also to a printing method using the ink set and to a system for printing the ink set.

16 Claims, 1 Drawing Sheet

(56) References Cited

U.S. PATENT DOCUMENTS

| | | |
|---|---|---|
| 6,936,648 B2 | 8/2005 | Bagwell et al. |
| 7,129,284 B2 | 10/2006 | Ma et al. |
| 7,246,896 B2 | 7/2007 | Askeland et al. |
| 7,388,040 B2 | 6/2008 | Sader et al. |
| 7,696,262 B2 | 4/2010 | Cagle et al. |
| 7,744,205 B2 | 6/2010 | Sarkisian et al. |
| 8,113,643 B2 | 2/2012 | Sarkisian et al. |
| 8,114,923 B2 | 2/2012 | Sarkisian et al. |
| 8,267,505 B2 | 9/2012 | Jolly et al. |
| 8,440,742 B2 | 5/2013 | Cagle et al. |
| 8,540,358 B2 | 9/2013 | Mozel et al. |
| 8,746,869 B2 | 6/2014 | Matsuyama et al. |
| 8,777,390 B2 | 7/2014 | Bruinsma et al. |
| 8,783,842 B2 | 7/2014 | Ingle et al. |
| 8,801,162 B2 | 8/2014 | Matsumoto et al. |
| 8,857,962 B2 | 10/2014 | Goto et al. |
| 9,062,217 B2 | 6/2015 | Gotou et al. |
| 9,133,355 B2 | 9/2015 | Brandstein et al. |
| 9,187,667 B2 | 11/2015 | Doumaux et al. |
| 9,278,515 B2 | 3/2016 | Sarkisian et al. |
| 2003/0087991 A1 | 5/2003 | Engel et al. |
| 2004/0063809 A1 | 4/2004 | Fu et al. |
| 2004/0166252 A1 | 8/2004 | Takashima et al. |
| 2005/0176847 A1 | 8/2005 | Cagle |
| 2005/0206705 A1 | 9/2005 | Ma et al. |
| 2006/0092251 A1 | 5/2006 | Prasad et al. |
| 2007/0084380 A1 | 4/2007 | Cagle et al. |
| 2009/0246377 A1 | 10/2009 | Robertson et al. |
| 2009/0295847 A1 | 12/2009 | Mukai et al. |
| 2010/0173077 A1 | 7/2010 | Ming |
| 2010/0231671 A1 | 9/2010 | Anton et al. |
| 2011/0001779 A1 | 1/2011 | Kida |
| 2011/0071249 A1 | 3/2011 | Bui et al. |
| 2011/0234689 A1 | 9/2011 | Saito |
| 2011/0303113 A1 | 12/2011 | Sarkisian et al. |
| 2011/0318551 A1 | 12/2011 | Nakagawa |
| 2012/0092413 A1 | 4/2012 | Kawamura |
| 2013/0072614 A1 | 3/2013 | Lindstrom et al. |
| 2013/0079447 A1* | 3/2013 | Koike ............... C09D 11/106 524/377 |
| 2013/0201252 A1 | 8/2013 | Namba |
| 2013/0222503 A1* | 8/2013 | Okuda ............... C09D 11/037 347/102 |
| 2013/0330526 A1 | 12/2013 | Song et al. |
| 2014/0141212 A1 | 5/2014 | Fu et al. |
| 2014/0204155 A1* | 7/2014 | Vanbesien ........... C09D 11/324 347/100 |
| 2014/0220314 A1 | 8/2014 | Wu et al. |
| 2014/0220315 A1 | 8/2014 | Zhang et al. |
| 2015/0225586 A1 | 8/2015 | Ingle et al. |
| 2015/0252205 A1 | 9/2015 | Sarkisian et al. |
| 2015/0267073 A1 | 9/2015 | Zhou et al. |
| 2015/0273853 A1 | 10/2015 | Govyadinov et al. |
| 2015/0275007 A1 | 10/2015 | Cagle et al. |
| 2015/0283828 A1 | 10/2015 | Aoai et al. |
| 2015/0368488 A1 | 12/2015 | Robello et al. |
| 2016/0185124 A1 | 6/2016 | Govyadinov |
| 2016/0257154 A1 | 9/2016 | Miyamachi et al. |
| 2016/0312404 A1 | 10/2016 | Pan et al. |
| 2016/0319147 A1 | 11/2016 | Chen et al. |
| 2016/0326391 A1 | 11/2016 | Doumaux et al. |
| 2016/0333209 A1 | 11/2016 | Shimono et al. |
| 2017/0355867 A1 | 12/2017 | Kasperchik |
| 2019/0225828 A1 | 7/2019 | Cagle et al. |

FOREIGN PATENT DOCUMENTS

| | | |
|---|---|---|
| EP | 1403342 | 3/2004 |
| EP | 1561788 | 8/2005 |
| EP | 1586454 | 10/2005 |
| EP | 1403346 | 11/2006 |
| EP | 1923435 | 5/2008 |
| EP | 2508577 | 10/2012 |
| EP | 2621731 | 8/2013 |
| JP | 2005126466 | 5/2005 |
| JP | 2014091795 | 5/2014 |
| JP | 2014240451 | 12/2014 |
| RU | SU891732 | 12/1981 |
| RU | 2588245 | 6/2016 |
| WO | WO-2003031191 | 4/2003 |
| WO | WO-2007112337 | 10/2007 |
| WO | WO 2009128833 | 10/2009 |
| WO | WO-2011028201 | 3/2011 |
| WO | WO-2011146069 A1 | 11/2011 |
| WO | WO-2012008978 | 1/2012 |
| WO | WO-2014042653 | 3/2014 |
| WO | WO 2015023274 | 2/2015 |
| WO | WO 2015041702 | 3/2015 |
| WO | WO-2015134020 | 9/2015 |
| WO | WO 2015142335 | 9/2015 |
| WO | WO 2016092309 | 6/2016 |
| WO | WO-2016130158 | 8/2016 |
| WO | WO-2016175738 | 11/2016 |
| WO | WO-2017009601 | 1/2017 |
| WO | WO-2017014747 | 1/2017 |
| WO | WO-2018143957 | 8/2018 |

OTHER PUBLICATIONS

International Search Report and Written Opinion for International Application No. PCT/US2018/012628 dated Apr. 12, 2018, 6 pages.

TGSC Information System Bulletin for Glycereth-7, www.thegoodscentcompany.com/data/rw1300121.html, date unknown.

ChemSpider bulletin for Glycereth-3, http://www.chemspider.com/Chemical-Structure.80131.html; date unknown.

\* cited by examiner

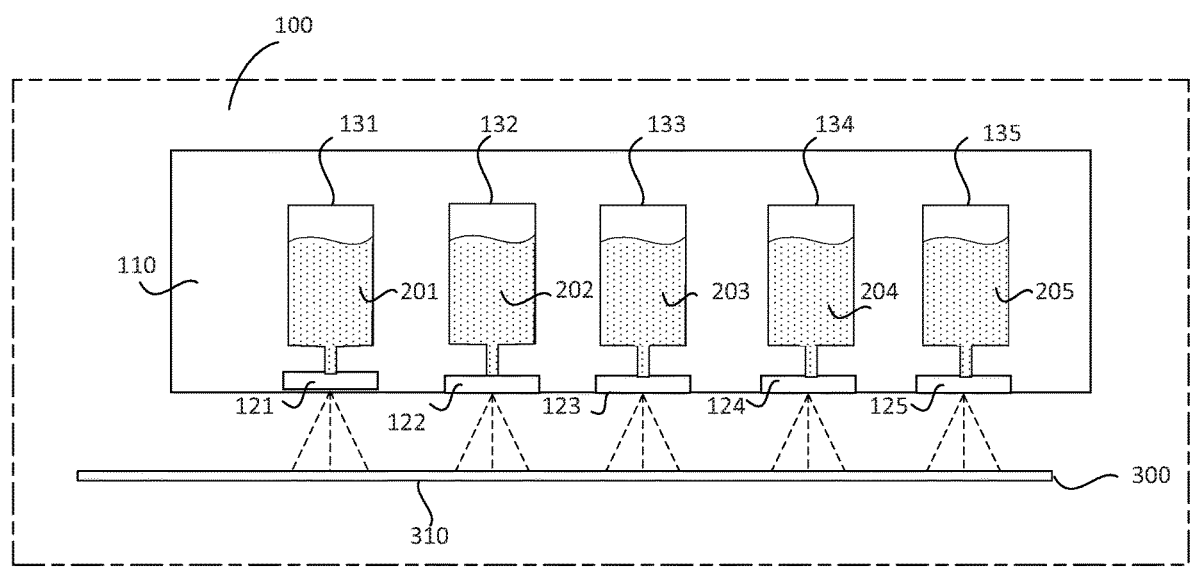

INKJET INK SET

BACKGROUND

In addition to home and office usage, inkjet technology has been expanded to high-speed, commercial and industrial printing. Inkjet printing is a non-impact printing method that utilizes electronic signals to control and direct droplets or a stream of ink to be deposited on media. Some commercial and industrial inkjet printers utilize fixed printheads and a moving substrate web in order to achieve high speed printing. Current inkjet printing technology involves forcing the ink drops through small nozzles by thermal ejection, piezoelectric pressure or oscillation onto the surface of the media. This technology has become a popular way of recording images on various media surfaces (e.g., paper), for many reasons, including, low printer noise, capability of high-speed recording and multi-color recording. In some instances, an ink set (which may include two or more different colored inks) may be used as an ink source for the inkjet printing system. The ink droplets that are formed from one or more of the inks that are part of an ink set are ejected from a nozzle by the inkjet system onto the paper to produce an image thereon. The inks play a fundamental role in the image quality resulting from this printing technique. Notwithstanding their recent success, research and development efforts continue toward advancing inkjet print quality over a wide variety of different applications, but there remain challenges.

BRIEF DESCRIPTION OF THE DRAWING

The drawing illustrates various examples of the present inkjet ink set and is part of the specification. FIG. 1 is a schematic illustration of an example of a system for printing an ink set according to one example of the present disclosure.

DETAILED DESCRIPTION

Before the ink compositions, methods and related aspects of the disclosure are disclosed and described, it is to be understood that this disclosure is not restricted to the particular process features and materials disclosed herein because such process features and materials may vary somewhat. It is also to be understood that the terminology used herein is used for the purpose of describing particular examples. The terms are not intended to be limiting because the scope is intended to be limited by the appended claims and equivalents thereof.

It is noted that, as used in this specification and the appended claims, the singular forms "a," "an," and "the" include plural referents unless the context clearly dictates otherwise. Concentrations, amounts, and other numerical data may be expressed or presented herein in a range format. It is to be understood that such a range format is used merely for convenience and brevity and thus should be interpreted flexibly to include not just the numerical values explicitly recited as the end points of the range, but also to include all the individual numerical values or sub-ranges encompassed within that range as if each numerical value and sub-range is explicitly recited. As an illustration, a numerical range of "about 1 wt % to about 5 wt %" should be interpreted to include not just the explicitly recited values of about 1 wt % to about 5 wt %, but also include individual values and subranges within the indicated range. Thus, included in this numerical range are individual values such as 2, 3.5, and 4 and sub-ranges such as from 1-3, from 2-4, and from 3-5, etc. This same principle applies to ranges reciting a single numerical value. Furthermore, such an interpretation should apply regardless of the breadth of the range or the characteristics being described. As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary. As used herein, the term "about" is used to provide flexibility to a numerical range endpoint by providing that a given value may be a little above or a little below the endpoint. The degree of flexibility of this term can be dictated by the particular variable. Unless otherwise stated, any feature described herein can be combined with any aspect or any other feature described herein.

Inkjet printing with aqueous inks is increasingly being used to print on wide variety of media, including non-porous flexible and rigid media. However, durability of aqueous inks on substrates often poses a challenge. Inks need to wet and adhere to a broad range of substrates, have good abrasion and scratch resistance, resist attack by water, cleaning fluids, and solvents, and have good outdoor weatherability. There have been great improvements in the durability of aqueous ink-jet inks through incorporation of certain ink-jet compatible latex polymer dispersions made by emulsion polymerization. When printed as part of an ink-jet ink, a latex component of the ink can form a film on a media surface, entrapping and protecting the colorant within the hydrophobic print film.

It is recognized that inkjet printing of aqueous inks on non-porous media is substantially different than inkjet applications for traditional porous paper-based media. On porous papers, ink drying occurs primarily by ink penetration into the media pore structure, and control of image quality aspects is a strong function of the rate of ink penetration into the media. Thus, optimization of the penetration rate is used for attributes such as optical density and color-to-color bleed. On non-porous media, there is no penetration of the ink into the media, i.e. the colorant remains on the surface of the media, and image quality defects resulting from wetting and ink migration across the nonporous surface are more difficult to control, especially at high printing speeds. For example, non-porous flexible or rigid media are used in product packaging, signage, and other applications.

In addition, certain pigments can be more challenging than other in achieving certain desirable printing and jetting properties. For example, ink opacity corresponding to white color appearance can be more difficult to achieve for white inks compared to black, magenta, or cyan inks. Additionally, high colorant loads and large pigment particle sizes can lead to settling that clogs inkjet print heads and other microchannels. More specifically, the combination of high bulk densities and larger particle sizes tend to lead to high settling rates of the pigment in water-based inkjet ink formulations, and these larger and denser pigments can form a sediment very rapidly, e.g., within a few days.

Thus, the present disclosure is drawn to an ink set, including water-based inkjet inks, that can be jetted from various types of inkjet print heads, but which can also be friendly for use in thermal inkjet print heads. These inks can be printed not only on porous media, but also effectively on more challenging non-porous media.

The ink set of the present disclosure exhibits good image quality and good image durability when the inks, contained in the ink set, are used in inkjet printing devices and printed on substrates to form a printed image, specifically on non-porous substrates. Image quality performance may be measured in terms of the optical density, coalescence, and durability of a printed image. The term "optical density," as referred to herein, means the ability of a printed image to reduce transmitted light rays. A higher optical density equates to better image quality performance. The term "coalescence," as used to herein, refers to the phenomenon of separately deposited drops of ink merging together to form larger pools of ink. Coalescence can lead to blurring of the printed image and therefore, to poor image quality performance.

Durability performance may be measured in terms of the mechability and abrasion resistance of a printed image. The term "mechability," as referred to herein, is a form of durability, and means the ability of a printed image to remain undamaged when rubbed immediately after printing. Printers may contain media rollers, which may pass over images shortly after they are printed (e.g., within a few seconds). The stress applied to the printed image by the media rollers, which may be at elevated temperatures, may damage the image by changing its gloss, optical density, or film uniformity. The media rollers may also damage the printed image by removing pieces of the ink film and/or exposing bare media. A mechability test may simulate these post-printing conditions and determine if the printed image is durable enough to withstand the stress that may be applied by the media rollers. The term "abrasion resistance," as referred to herein means the ability of a printed image to remain undamaged when rubbed. High abrasion resistance can lead to good durability performance.

The ink sets of the present disclosure also have good jettability performances. The term "decap performance," as referred to herein, means the ability of the inkjet ink to readily eject from the printhead, upon prolonged exposure to air. The decap time is measured as the amount of time that a printhead may be left uncapped before the nozzles no longer fire properly, potentially because of clogging, plugging, or retraction of the colorant from the drop forming region of the nozzle/firing chamber. The length of time a thermal inkjet pen can remain unused and uncapped before spitting would be required to form an acceptable quality ink drop is called decap time, or first drop decap time. Another decap metric is the number of spits required to get the pen healthy at a specific time interval. The longest decap time that would give acceptable first drop quality or the fewest number of spits required at any given decap time would be desirable for any given ink.

The present disclosure refers to an inkjet ink set comprising a black ink with a black pigment, a yellow ink with a yellow pigment, a cyan ink with a cyan pigment, a magenta ink with a magenta pigment, and a white ink with a white pigment wherein at least one of the ink further contains a latex binder that is dispersed in the ink vehicle, and that includes a first heteropolymer including two or more aliphatic (meth)acrylate ester monomers or two or more aliphatic (meth)acrylamide monomers; and a second heteropolymer including a cycloaliphatic monomer and an aromatic monomer.

The present disclosure refers also to a method of producing images comprising providing a print media substrate; providing an ink set including a black ink with a black pigment, a yellow ink with a yellow pigment, a cyan ink with a cyan pigment, a magenta ink with a magenta pigment and, a white ink with a white pigment wherein at least one of the ink further contains a latex binder that is dispersed in the ink vehicle, and that includes a first heteropolymer including two or more aliphatic (meth)acrylate ester monomers or two or more aliphatic (meth)acrylamide monomers; and a second heteropolymer including a cycloaliphatic monomer and an aromatic monomer; and inkjet printing at least one ink composition from the ink set to the print substrate to form an ink layer disposed on print media substrate. The present disclosure refers also to a system for printing the ink set described herein.

As used herein, the term "ink set" refers to an ink composition package comprising two or more ink compositions having different colors from each other and that might be used in conjunction, in a common printer system, to form a color image. The term "ink set" refers thus to all individual inks or fluids an inkjet printer is equipped to jet. All of the inks present in a common printer can be considered an ink set, or a few inks from a larger group on inks can be considered to be an ink set. The ink set would be used in an inkjet printing system or inkjet printer. Such inkjet printing system or printer can be a thermal inkjet printer, piezoelectric inkjet printers, other drop on demand inkjet printers, and/or continuous inkjet printers.

The ink composition comprised in the inkjet ink set of the present disclosure an inkjet composition comprising a latex binder that is dispersed in the ink vehicle. The inks described herein are liquid thermal inkjet ink that include a colorant dispersed in an ink vehicle. As used herein, the term "ink vehicle" refers to the combination of at least one or more solvents and water to form a vehicle in which the colorant is placed to form an ink. It is to be understood that the respective ink vehicles for the black ink, the yellow ink, the cyan ink, the magenta ink and the white ink can be substantially the same or not. The ink vehicle for these respective inks is formulated so that the vehicle is compatible with a binder latex (described in further detail below). Ink vehicles may include a mixture of a variety of different agents, including, for example, surfactants, solvents, co-solvents, buffers, biocides, viscosity modifiers, sequestering agents, stabilizing agents, humectants and water.

As used herein, "latex," "latex polymer," or "latex particles" refer to the polymeric masses synthesized from individual monomers, which can be dispersed in a liquid vehicle forming a latex dispersion. The term "latex" generally refers to liquid and polymeric particles that are dispersed within the liquid. However, when a latex (i.e. a latex dispersion including latex polymer particles) is formulated within an ink, the liquid becomes part of the liquid vehicle of the ink, and thus, latex polymer can be described based on the latex particle or latex polymer solids that remain dispersed in the liquid vehicle.

As used herein, "co-polymer" refers to a polymer that is polymerized from at least two monomers. A certain monomer may be described herein as constituting a certain weight percentage of a polymer. A "heteropolymer" refers to polymers derived from two or more different types of monomer. This indicates that the repeating units formed from the said monomer in the polymer constitute said weight percentage of the polymer.

In some examples, inkjet ink sets described herein are especially well adapted to non-porous substrates. In some other examples, the inkjet ink set described herein are especially well adapted to flexible or to rigid non-porous substrates. The non-porous print substrate or non-porous substrate used herein refers to media substrate with surfaces that have relatively poor water permeability and absorption.

Vinyl, polypropylene, polyethylene and other plastic sheets or films, metals, coated offset media, glass, certain woods, and other similar substrates are considered to be non-porous.

The inkjet ink set of the present disclosure comprises a black ink with a black pigment, a yellow ink with a yellow pigment, a cyan ink with a cyan pigment, a magenta ink with a magenta pigment, and a white ink with a white pigment. Within this inkjet ink set, at least one of the inks further contains a latex binder that is dispersed in the ink vehicle, and that includes a first heteropolymer including two or more aliphatic (meth)acrylate ester monomers or two or more aliphatic (meth)acrylamide monomers; and a second heteropolymer including a cycloaliphatic monomer and an aromatic monomer.

The ink compositions that are part of the ink set are inkjet inks. Such inks might comprise pigments, that can be black, yellow, magenta, cyan or white, dispersed in an ink vehicle. In some examples, the ink vehicle comprises water and co-solvent. By "inkjet" it is meant herein an ink composition that could be used in printing devise using inkjet technique, which includes thermal inkjet printing and piezoelectric inkjet printing and other continuous inkjet printing techniques.

Latex Binder Polymer

In some examples, at least one of the inks that are part of the inkjet ink set of the present disclosure comprises a latex binder dispersed in an ink vehicle. The latex binder can also be referred as a latex polymer or latex particles. Each of the latex binder are latex particles including a first heteropolymer, also called "first heteropolymer composition", including two or more aliphatic (meth)acrylate ester monomers or two or more aliphatic (meth)acrylamide monomers; and a second heteropolymer, also called "second heteropolymer composition", including a cycloaliphatic monomer and an aromatic monomer. Latex polymers can be prepared using any number of methods known in the art, including but not limited to emulsion polymerization techniques where co-monomers are dispersed and polymerized in a discontinuous phase of an emulsion. The latexes can also be dispersions of polymer prepared by other techniques known to those in the art.

In the examples disclosed herein, the latex binder particles include multiple heteropolymer compositions within each individual particle. One of the heteropolymer compositions may be considered a soft polymer composition, in part because it provides the polymer particle with properties that are suitable for forming printed images on flexible non-porous media. The other of the heteropolymer compositions may be considered a hard polymer composition, in part because it provides the polymer particle with properties that are suitable for forming printed images on rigid non-porous media. In the examples disclosed herein, a particular monomer may be described as constituting a certain weight percentage of the first heteropolymer composition or of the second heteropolymer composition. This indicates that the repeating units formed from the monomer in the heteropolymer constitute the weight percentage of the heteropolymer.

The latex binder particles may be present in the inkjet ink composition in an amount ranging from about 5 wt % to about 35 wt % of a total weight of the inkjet ink composition. When the latex binder particles are incorporated into the inkjet ink composition as part of an aqueous emulsion (e.g., which also includes water), it is to be understood that these percentages account for the weight percent of solid latex binder particles or active latex binder particles in the inkjet ink composition, and does not account for the total weight percent of the aqueous emulsion that may be incorporated in the inkjet ink composition. In some examples, the inkjet ink composition includes an amount of white pigment and an amount of the latex binder particles, such that the ratio of the amount of white pigment to amount of latex binder particles by weight is in the range of about 0.1:15 to 10:5. In some other examples, the inkjet ink composition includes an amount of white pigment and an amount of the latex binder particles, such that the ratio of the amount of white pigment to amount of latex binder particles by weight is in the range of about 2:10 to 20:5.

The latex binder particles may be referred to as latex particles. The particle size of the latex binder particles may range from about 0.06 µm (about 60 nm) to about 0.4 µm (about 400 nm). In another example, the particle size of the latex particles may range from about 0.1 µm to about 0.3 µm.

In some examples, the latex binder particles disclosed herein includes a first heteropolymer including two or more aliphatic (meth)acrylate ester monomers or two or more aliphatic (meth)acrylamide monomers; and a second heteropolymer including a cycloaliphatic monomer and an aromatic monomer.

In some other examples, the latex binder particles disclosed herein includes a first heteropolymer including two or more aliphatic (meth)acrylate ester monomers or two or more aliphatic (meth)acrylamide monomers; and a second heteropolymer including a cycloaliphatic monomer and an aromatic monomer, the cycloaliphatic monomer being selected from the group consisting of a cycloaliphatic (meth)acrylate monomer and a cycloaliphatic (meth)acrylamide monomer and the aromatic monomer being selected from the group consisting of an aromatic (meth)acrylate monomer and an aromatic (meth)acrylamide monomer.

In yet some other examples, the latex binder particles disclosed herein includes a first heteropolymer including two or more aliphatic (meth)acrylate ester monomers or two or more aliphatic (meth)acrylamide monomers; and a second heteropolymer composition having a higher glass transition temperature (Tg) than a Tg of the first heteropolymer composition, the second heteropolymer including a cycloaliphatic monomer and an aromatic monomer, the cycloaliphatic monomer being selected from the group consisting of a cycloaliphatic (meth)acrylate monomer and a cycloaliphatic (meth)acrylamide monomer and the aromatic monomer being selected from the group consisting of an aromatic (meth)acrylate monomer and an aromatic (meth)acrylamide monomer. The first heteropolymer composition may be considered the soft polymer composition and the second heteropolymers composition may be considered the hard polymer composition.

It has been found that the amount of the first heteropolymer composition within the latex binder impacts the ability of the ink to adequately adhere to both rigid and flexible substrates. Additionally, it has been found that while a lower percentage (e.g., less than 15 wt %) of the first heteropolymer composition may improve color maintenance during stretching, this percentage does not impart flaking resistance. The "flaking resistance" as referred to herein means the ability of a printed image to not crack and/or lose adhesion from a flexible media, particularly when the media is flexed.

. As such, in the examples disclosed herein, the first heteropolymer composition is present in an amount ranging from about 15 wt % to about 70 wt % of a total weight of the latex binder particle; and the second heteropolymer composition is present in an amount ranging from about 30 wt % to about 85 wt % of the total weight of the latex binder. In other examples, the first heteropolymer composition is present in an amount ranging from about 30 wt % to about 40 wt % of a total weight of the latex binder particle; and the second heteropolymer composition is present in an amount ranging from about 60 wt % to about 70 wt % of the total weight of the latex binder particle. In one specific example, the first heteropolymer composition is present in an amount of about 35 wt % of a total weight of the latex binder particle; and the second heteropolymer composition is present in an amount of about 65 wt % of the total weight of the latex binder particle.

The first heteropolymer composition includes two or more aliphatic (meth)acrylate ester monomers or two or more aliphatic (meth)acrylamide monomers. The term "(meth) acrylate" refers to both acrylates and methacrylates. For example, "ethyl (meth)acrylate" refers to ethyl acrylate and/or ethyl methacrylate. The term "(meth)acrylamide" refers to both acrylamides and methacrylamides. For example, the term "methyl (meth)acrylamide" denotes methyl acrylamide and/or methyl methacrylamide.

In an example, in the first heteropolymer of the latex binder, the two or more aliphatic (meth)acrylate ester monomers are linear aliphatic (meth)acrylate ester monomers, cycloaliphatic (meth)acrylate ester monomers, or combinations thereof or the two or more aliphatic (meth)acrylamide monomers are selected from the group consisting of C1 to C8 alkyl acrylamide monomers and C1 to C8 alkyl methacrylamide monomers.

As previously mentioned, the aliphatic (meth)acrylate ester monomers may be linear aliphatic (meth)acrylate ester monomers and/or cycloaliphatic (meth)acrylate ester monomers. Examples of the linear aliphatic (meth)acrylate ester monomers are selected from the group consisting of ethyl acrylate, ethyl methacrylate, benzyl acrylate, benzyl methacrylate, propyl acrylate, propyl methacrylate, isopropyl acrylate, isopropyl methacrylate, butyl acrylate, butyl methacrylate, isobutyl acrylate, isobutyl methacrylate, hexyl acrylate, hexyl methacrylate, isooctyl acrylate, isooctyl methacrylate, octadecyl acrylate, octadecyl methacrylate, lauryl acrylate, lauryl methacrylate, hydroxyethyl acrylate, hydroxyethyl methacrylate, hydroxyhexyl acrylate, hydroxyhexyl methacrylate, hydroxyoctadecyl acrylate, hydroxyoctadecyl methacrylate, hydroxylauryl methacrylate, hydroxylauryl acrylate, 2-ethylhexyl acrylate, 2-ethylhexyl methacrylate, and combinations thereof. Examples of the cycloaliphatic (meth)acrylate ester monomers are selected from the group consisting of cyclohexyl acrylate, cyclohexyl methacrylate, methylcyclohexyl acrylate, methylcyclohexyl methacrylate, trimethylcyclohexyl acrylate, trimethylcyclohexyl methacrylate, tert-butylcyclohexyl acrylate, tert-butylcyclohexyl methacrylate, and combinations thereof.

Examples of some specific monomer combinations used to form the first heteropolymer composition include methyl methacrylate, butyl acrylate, and methacrylic acid or butyl methacrylate, butyl acrylate, and methacrylic acid. In these examples, the composition may include the (meth)acrylates in an amount ranging from about 85 wt % to about 99 wt % and the (meth)acrylic acid in an amount ranging from about 1 wt % to about 15 wt %, where these weight percentages are based on the total weight solids of the composition. The type and amount of each of the two or more monomer units that are polymerized to form the first heteropolymer composition are selected so that the $T_g$ of the first heteropolymer composition ranges from about −25° C. to about 10° C. The $T_g$ of the first heteropolymer composition and the $T_g$ of the second heteropolymer composition may be defined in relation to each other, and the $T_g$ of the first heteropolymer composition is generally lower than the $T_g$ of the second heteropolymer composition.

The second heteropolymer composition includes the cycloaliphatic monomer and the aromatic monomer. In some examples, the second heteropolymer composition includes a cycloaliphatic monomer that is selected from the group consisting of a cycloaliphatic (meth)acrylate monomer and a cycloaliphatic (meth)acrylamide monomer. In some other examples, the second heteropolymer composition includes an aromatic monomer being selected from the group consisting of an aromatic (meth)acrylate monomer and an aromatic (meth)acrylamide monomer.

The cycloaliphatic monomer may be a cycloaliphatic (meth)acrylate monomer or a cycloaliphatic (meth)acrylamide monomer. In some examples, the cycloaliphatic (meth) acrylate or (meth)acrylamide monomer is a cycloaliphatic monomer having the formula (I):

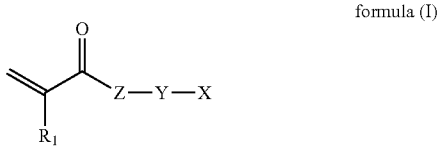

formula (I)

wherein: $R_1$ is H or methyl; Z is O (i.e., the monomer is an acrylate) or $NR_2$ (i.e., the monomer is an acrylamide) where $R_2$ is H, an alkyl or X'; Y is a bond or a carbon chain, where one or more of the carbon atoms of the carbon chain may be replaced with a heteroatom such as oxygen, sulfur, or nitrogen; and X and X' are independently cycloaliphatic moieties.

In some examples $R_2$ is an alkyl, for example C1 to C12, C1 to C10, C1 to C6, or C1 to C4 alkyls. In an example, $R_2$ is a methyl (C1 alkyl) or an ethyl (C2 alkyl). In some other examples, $R_2$ is a substituted alkyl group. In still some examples $R_2$ is H, a substituted alkyl group, or X'. Yet further $R_2$ may be H or X'. In some examples, $R_2$ is H.

In some examples, Y is a bond or a saturated or unsaturated carbon chain. In some examples, Y is a bond or a C1 to C12, for example C1 to C10, C1 to C6, or C1 to C4, carbon chain. In some examples, one or more of the carbon atoms of the carbon chain represented by Y is replaced with a heteroatom selected from oxygen, sulfur and nitrogen. In some examples, Y is a bond.

In some examples, X is a 5-12 membered ring, for example a carbon ring having 5-12 carbon atoms (i.e., a C5 to C12 ring), or a 5-12 membered heteroaliphatic ring. In some examples, X is a C5 to C12 single ring (such as cyclopentyl, cyclohexyl or cycloheptyl groups) or a bicyclic ring (such as decalin). As some specific examples, X may be a carbon ring having 5-10 carbon atoms or a carbon ring having 6-10 carbon atoms. X may also be substituted, for example, with an alkyl, alkoxy, hydroxyl, heteroalkyl, aryl, cycloaliphatic, or aromatic substituent. In some examples, X is substituted with an alkyl group (for example, a C1 to C12 alkyl group), or an aryl group (for example, a C5 to C12 aryl group), or with a heteroalkyl group (for example, a C1 to C12 heteroalkyl group).

X' is a carbon ring having 5-12 carbon atoms (i.e., a C5 to C12 ring), or a 5-12 membered heteroaliphatic ring. In some examples, X' is a C5 to C12 single ring (such as cyclopentyl, cyclohexyl or cycloheptyl groups) or a bicyclic ring (e.g., two C6 fused rings, i.e., a C10 ring, such as decalin). As specific examples, X' may be a carbon ring having 5-10 carbon atoms or a carbon ring having 6-10 carbon atoms. X' may also be substituted, for example, with an alkyl, alkoxy, hydroxyl, heteroalkyl, cycloaliphatic or aromatic substituent. In some examples, X' is substituted with an alkyl group (for example a C1 to C12 alkyl group, a C5 to C12 aryl group, a C1 to C12 heteroalkyl group.

In some examples when Z is $NR_2$ and $R_2$ is X', then X and X' may be the same.

Some specific examples of the cycloaliphatic monomer include cyclohexyl acrylate ($R_1$ is H, Z is O, Y is a bond, and X is a 6 membered ring), cyclohexyl methacrylate ($R_1$ is methyl ($CH_3$), Z is O, Y is a bond, and X is a 6 membered ring), methylcyclohexyl acrylate ($R_1$ is H, Z is O, Y is a bond, and X is a methyl-substituted 6 membered ring), methylcyclohexyl methacrylate ($R_1$ is methyl ($CH_3$), Z is O, Y is a bond, and X is a 1-methyl-substituted 6 membered ring), trimethylcyclohexyl acrylate ($R_1$ is H, Z is O, Y is a bond, and X is a 3,3,5-methyl-substituted 6 membered ring), trimethylcyclohexyl methacrylate ($R_1$ is methyl ($CH_3$), Z is O, Y is a bond, and X is a 3,3,5-methyl-substituted 6 membered ring), and combinations thereof.

The aromatic monomer may be an aromatic (meth)acrylate monomer or an aromatic (meth)acrylamide monomer. In some example, the aromatic (meth)acrylate or (meth)acrylamide monomer is an aromatic monomer having the formula (II):

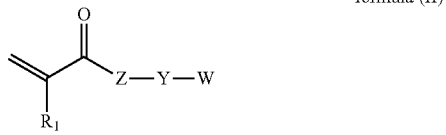

formula (II)

wherein: $R_1$ is H or methyl; Z is O (i.e., the monomer is an acrylate) or $NR_2$ (i.e., the monomer is an acrylamide) where $R_2$ is H, an alkyl or W'; Y is a bond or a carbon chain, where one or more of the carbon atoms of the carbon chain may be replaced with a heteroatom such as oxygen, sulfur, or nitrogen; and W and W' are independently aromatic moieties.

In some examples $R_2$ is an alkyl, for example C1 to C12, C1 to C10, C1 to C6, or C1 to C4 alkyls. In an example, $R_2$ is a methyl (C1 alkyl) or an ethyl (C2 alkyl). In some other examples, $R_2$ is a substituted alkyl group. In still some examples $R_2$ is H, a substituted alkyl group, or W'. Yet further $R_2$ may be H or W'. In some examples, $R_2$ is H.

In some examples, Y is a bond or a saturated or unsaturated carbon chain. In some examples, Y is a bond or a C1 to C12, for example C1 to C10, C1 to C6, or C1 to C4, carbon chain. In some examples, one or more of the carbon atoms of the carbon chain represented by Y is replaced with a heteroatom selected from oxygen, sulfur and nitrogen. In some examples, Y is a bond.

In some examples, W is a 5-12 membered aromatic ring. As examples, W may be a carbon ring having 6-12 carbon atoms (i.e., a C6 to C12 aromatic ring), or a 5-12 membered heteroaromatic ring. In some examples, W is a C5 to C12 aromatic ring, and the C5 to C12 aromatic ring may be a single aromatic ring (e.g., benzyl or phenyl) or a bicyclic aromatic ring (e.g., two C6 fused aromatic rings, i.e., a C10 aromatic ring, e.g., naphthyl). As some specific examples, W may be an aromatic carbon ring having 5-10 carbon atoms or an aromatic carbon ring having 6-10 carbon atoms. W may also be substituted, for example, with an alkyl, aryl, or heteroalkyl substituent. In some examples, W is substituted with an alkyl group (for example, a C1 to C12 alkyl group), or an aryl group (for example, a C5 to C12 aryl group), or a heteroalkyl group (for example, a C1 to C12 heteroalkyl group).

W' is an aromatic carbon ring having 5-12 carbon atoms (i.e., a C5 to C12 aromatic ring, or a 5-12 membered heteroaromatic ring. In some examples, W' is a C6 to C12 single aromatic ring (e.g., benzyl or phenyl), or a bicyclic ring (e.g., two C6 fused aromatic rings, i.e., a C10 aromatic ring, e.g., naphthyl). As specific examples, W' may be an aromatic ring having 5-10 carbon atoms or having 6-10 carbon atoms. W' may also be substituted, for example, with an alkyl group, an aryl group, or a heteroalkyl group.

In some examples when Z is $NR_2$ and $R_2$ is W', then W and W' may be the same. Some specific examples of the aromatic monomer include 2-phenoxyethyl methacrylate ($R_1$ is methyl ($CH_3$), Z is O, Y is —$CH_2$—$CH_2$—O—, and W is a 6 membered aromatic ring), 2-phenoxyethyl acrylate ($R_1$ is H, Z is O, Y is —$CH_2$—$CH_2$—O—, and W is a 6 membered aromatic ring), phenyl propyl methacrylate ($R_1$ is methyl ($CH_3$), Z is O, Y is —$(CH_2)_3$—, and W is a 6 membered aromatic ring), phenyl propyl acrylate ($R_1$ is H, Z is O, Y is —$(CH_2)_3$—, and W is a 6 membered aromatic ring), benzyl methacrylate ($R_1$ is methyl ($CH_3$), Z is O, Y is —$CH_2$—, and W is a 6 membered aromatic ring), benzyl acrylate ($R_1$ is H, Z is O, Y is —$CH_2$—, and W is a 6 membered aromatic ring), phenylethyl methacrylate ($R_1$ is methyl ($CH_3$), Z is O, Y is —$(CH_2)_2$—, and W is a 6 membered aromatic ring), phenylethyl acrylate ($R_1$ is H, Z is O, Y is —$(CH_2)_2$—, and W is a 6 membered aromatic ring), benzhydryl methacrylate ($R_1$ is methyl ($CH_3$), Z is O, Y is —CH—, and W includes two 6 membered aromatic rings), benzhydryl acrylate ($R_1$ is H, Z is O, Y is —CH—, and W includes two 6 membered aromatic rings), 2-hydroxy-3-phenoxypropyl acrylate ($R_1$ is H, Z is O, Y is —$CH_2$—CHOH—$CH_2$—O, and W is a 6 membered aromatic ring), 2-hydroxy-3-phenoxypropyl methacrylate ($R_1$ is methyl ($CH_3$), Z is O, Y is —$CH_2$—CHOH—$CH_2$—O, and W is a 6 membered aromatic ring), N-benzyl methacrylamide ($R_1$ is methyl ($CH_3$), Z is NH, Y is —$CH_2$—, and W is a 6 membered aromatic ring), N-benzyl acrylamide ($R_1$ is H, Z is NH, Y is —$CH_2$—, and W is a 6 membered aromatic ring), N,N-diphenyl methacrylamide ($R_1$ is methyl ($CH_3$), Z is NW', where W' is a 6 membered aromatic ring, Y is a bond, and W is a 6 membered aromatic ring), N,N-diphenyl acrylamide ($R_1$ is H, Z is NW', where W' is a 6 membered aromatic ring, Y is a bond, and W is a 6 membered aromatic ring), naphthyl methacrylate ($R_1$ is methyl ($CH_3$), Z is O, Y is a bond, and W is naphthyl), naphthyl acrylate ($R_1$ is H, Z is O, Y is a bond, and W is naphthyl), phenyl methacrylate ($R_1$ is methyl ($CH_3$), Z is O, Y is a bond, and W is a 6 membered aromatic ring), phenyl acrylate ($R_1$ is H, Z is O, Y is a bond, and W is a 6 membered aromatic ring), and combinations thereof.

In some examples, in the second heteropolymer composition of the latex binder, the cycloaliphatic monomer is selected from the group consisting of cyclohexyl acrylate, cyclohexyl methacrylate, methylcyclohexyl acrylate, methylcyclohexyl methacrylate, trimethylcyclohexyl acrylate, trimethylcyclohexyl methacrylate, tert-butylcyclohexyl acrylate, tert-butylcyclohexyl methacrylate, and combinations thereof; and the aromatic monomer is selected from the group consisting of 2-phenoxyethyl methacrylate, 2-phenoxyethyl acrylate, phenyl propyl methacrylate, phenyl propyl acrylate, benzyl methacrylate, benzyl acrylate, phenylethyl methacrylate, phenylethyl acrylate, benzhydryl methacrylate, benzhydryl acrylate, 2-hydroxy-3-phenoxypropyl acrylate, 2-hydroxy-3-phenoxypropyl methacrylate, N-benzyl methacrylamide, N-benzyl acrylamide, N,N-diphenyl methacrylamide, N,N-diphenyl acrylamide, naphthyl methacrylate, naphthyl acrylate, phenyl methacrylate, phenyl acrylate, and combinations thereof.

In some examples, the second heteropolymer composition includes the cycloaliphatic monomer, the aromatic monomer, and an additional monomer selected from the group consisting of an unsaturated acid functional acrylate derivative, butyl acrylate, butyl methacrylate, and methyl methacrylate. Examples of the unsaturated acid functional acrylate derivative include methacrylic acid, acrylic acid, 2-sulfoethyl methacrylate, etc. The composition may include the cycloaliphatic monomer(s) in an amount ranging from about 60 wt % to about 90 wt %, the aromatic monomer(s) in an amount ranging from about 1 wt % to about 30 wt %, and when included, the additional monomer(s) in an amount ranging from about 0.1 wt % to about 10 wt %, where these weight percentages are based on the total weight solids of the composition. An example of a specific monomer combination used to form the second heteropolymer composition includes cyclohexyl methacrylate, cyclohexyl acrylate, 2-phenoxyethyl methacrylate, and methacrylic acid. Another example of a specific monomer combination used to form the second heteropolymer composition includes cyclohexyl methacrylate, cyclohexyl acrylate, 2-phenoxyethyl methacrylate, methacrylic acid and methyl methacrylate and/or butyl acrylate. In these examples, the composition may include the cycloaliphatic monomer(s) in an amount ranging from about 74 wt % to about 90 wt %, the aromatic monomer(s) in an amount ranging from about 1 wt % to about 20 wt %, and when included, the additional monomer(s) in an amount ranging from about 0.5 wt % to about 6 wt %, where these weight percentages are based on the total weight solids of the composition.

The type and amount of each of the cycloaliphatic monomer and the aromatic monomer that are polymerized to form the second heteropolymer composition are selected so that the $T_g$ of the second heteropolymer composition ranges from about 60° C. to about 110° C. The $T_g$ of the first heteropolymer composition is higher than the $T_g$ of the second heteropolymer composition.

In an example of the latex binder particle, the $T_g$ of the first heteropolymer composition ranges from about −25° C. to about 10° C.; the $T_g$ of the second heteropolymer composition ranges from about 60° C. to about 110° C.; and a $T_g$ of the latex binder particle ranges from about 25° C. to about 65° C. The glass transition temperature $T_g$ of the latex binder particle may be estimated using the Fox equation (T. G. Fox, Bull. Am. Physics Soc., Volume 1, Issue No. 3, page 123 (1956)) using the $T_g$ of the heteropolymer compositions 12, 14 forming the latex binder particle. The maximum $T_g$ of each of the heteropolymers compositions 12, 14 may be taken from literature values (for example as listed in "Polymer Handbook", edited by J. Brandrup, E. H. Immergut, and E. A. Grulke, Wiley Publishers, 4$^{th}$ edition). The glass transition temperature of the may also be determined using DSC (differential scanning calorimetry) according to ASTM D3418. Using ASTM D3418 may be less desirable, in part because this method for determining $T_g$ may be biased, as it takes into account other parameters, such as molecular weight, plasticization of the higher $T_g$ polymer by the lower $T_g$ polymer to form an intermediate $T_g$ mixture, and heating history of the actual DSC sample to determine the $T_g$. The individual amounts of the first heteropolymer composition and the second heteropolymer composition may be adjusted in accordance with the ranges provided herein in order to achieve the desired $T_g$ of the latex binder particle.

In one specific example of the latex binder particle, the first heteropolymer composition includes butyl acrylate, methyl methacrylate and methacrylic acid as the two or more aliphatic (meth)acrylate ester monomers; and the second heteropolymer composition includes cyclohexyl methacrylate and cyclohexyl acrylate as the cycloaliphatic monomers, 2-phenoxyethyl methacrylate as the aromatic monomer, and methacrylic acid as an additional monomer. In this specific example of the latex binder particle, the $T_g$ of the first heteropolymer composition ranges from about −8° C. to about −9° C.; the $T_g$ of the second heteropolymer composition ranges from about 85° C. to about 88° C.; and the latex binder particle includes about 35 wt % of the first heteropolymer composition and about 65 wt % of the second heteropolymer composition.

In some examples, the latex binder particle substantially lacks a styrene component. For example, the latex binder particle may include no more than 5% styrene (where the percentage is with respect to the total weight of the latex binder particle). In other example, the styrene (e.g., a styrene monomer) may be present in an amount of 4 wt % or less, 3 wt % or less, 2 wt % or less, 1 wt % or less, 0.5 wt % or less, or 0.1 wt % or less. In some examples, the latex polymer lacks a styrene component.

Pigments

The ink compositions that are part of the ink set comprise, at least, a pigment. The term pigment refers to any organic or inorganic pigment colorants, magnetic particles, aluminas, silicas, and/or other ceramics, organo-metallics, metallic particulates, or other opaque particles that introduce color to the ink vehicle. Pigments are suspended in the liquid vehicle and are therefore referred as pigment dispersion The average particle size of the pigments, present in the black, yellow, magenta or cyan ink composition of the ink set, may range anywhere from about 50 nm to about 200 nm. In an example, the average particle size ranges from about 80 nm to about 150 nm. The total amount of pigment dispersion in the ink can range from about 1.5% to about 5% based on the total weight of the liquid ink. In some examples, the total amount of pigment dispersion in the ink can range from about 2% to about 4% based on the total weight of the liquid ink. This weight percentage accounts for the weight percent of active pigment present in the liquid ink, and does not account for the total weight percent of the pigment dispersion in the liquid ink. As such, the weight percentages given for the pigment dispersion do not account for any other components (e.g., water) that may be present when the pigment is part of the dispersion.

The black ink, that is part of the ink set of the present disclosure, includes a black pigment. Said black pigment will provide a black color to the black ink. Carbon black may be a suitable black pigment. Examples of carbon black pigments include those manufactured by Mitsubishi Chemical Corporation, Japan (such as, e.g., carbon black No. 2300, No. 900, MCF88, No. 33, No. 40, No. 45, No. 52, MA7, MA8, MA100, and No. 2200B); various carbon black pigments of the RAVEN® series manufactured by Columbian Chemicals Company, Marietta, Ga., (such as, e.g., RAVEN® 5750, RAVEN® 5250, RAVEN® 5000, RAVEN® 3500, RAVEN® 1255, and RAVEN® 700); various carbon black pigments of the REGAL® series, the MOGUL® series, or the MONARCH® series manufactured by Cabot Corporation, Boston, Mass., (such as, e.g., REGAL® 400R, REGAL® 330R, REGAL® 660R, MOGUL® E, MOGUL® L, AND ELFTEX® 410); and various black pigments manufactured by Evonik Degussa Orion Corporation, Parsippany, N.J., (such as, e.g., Color Black FW1, Color Black FW2, Color Black FW2V, Color Black FW18, Color Black FW200, Color Black S150, Color Black S160, Color Black S170, PRINTEX® 35, PRINTEX® U, PRINTEX® V, PRINTEX® 140U, Special Black 5, Special Black 4A, and Special Black 4). An example of an organic black pigment includes aniline black, such as C.I. Pigment Black 1.

The yellow ink, that is part of the ink set of the present disclosure, includes a yellow pigment. Said yellow pigment will provide a yellow color to the yellow ink. Examples of suitable yellow pigments include C.I. Pigment Yellow 1, C.I. Pigment Yellow 2, C.I. Pigment Yellow 3, C.I. Pigment Yellow 4, C.I. Pigment Yellow 5, C.I. Pigment Yellow 6, C.I. Pigment Yellow 7, C.I. Pigment Yellow 10, C.I. Pigment Yellow 11, C.I. Pigment Yellow 12, C.I. Pigment Yellow 13, C.I. Pigment Yellow 14, C.I. Pigment Yellow 16, C.I. Pigment Yellow 17, C.I. Pigment Yellow 24, C.I. Pigment Yellow 34, C.I. Pigment Yellow 35, C.I. Pigment Yellow 37, C.I. Pigment Yellow 53, C.I. Pigment Yellow 55, C.I. Pigment Yellow 65, C.I. Pigment Yellow 73, C.I. Pigment Yellow 74, C.I. Pigment Yellow 75, C.I. Pigment Yellow 77, C.I. Pigment Yellow 81, C.I. Pigment Yellow 83, C.I. Pigment Yellow 93, C.I. Pigment Yellow 94, C.I. Pigment Yellow 95, C.I. Pigment Yellow 97, C.I. Pigment Yellow 98, C.I. Pigment Yellow 99, C.I. Pigment Yellow 108, C.I. Pigment Yellow 109, C.I. Pigment Yellow 110, C.I. Pigment Yellow 113, C.I. Pigment Yellow 114, C.I. Pigment Yellow 117, C.I. Pigment Yellow 120, C.I. Pigment Yellow 122, C.I. Pigment Yellow 124, C.I. Pigment Yellow 128, C.I. Pigment Yellow 129, C.I. Pigment Yellow 133, C.I. Pigment Yellow 138, C.I. Pigment Yellow 139, C.I. Pigment Yellow 147, C.I. Pigment Yellow 150, C.I. Pigment Yellow 151, C.I. Pigment Yellow 153, C.I. Pigment Yellow 154, C.I. Pigment Yellow 155, C.I. Pigment Yellow 167, C.I. Pigment Yellow 172, C.I. Pigment Yellow 180, C.I. Pigment Yellow 185, and C.I. Pigment Yellow 213. In some examples, the yellow pigment is C.I. Pigment Yellow 74.

The cyan ink, that is part of the ink set of the present disclosure, includes a cyan pigment. Said cyan pigment will provide a cyan color to the cyan ink Examples of suitable cyan pigments include C.I. Pigment Blue 1, C.I. Pigment Blue 2, C.I. Pigment Blue 3, C.I. Pigment Blue 15, Pigment Blue 15:3, C.I. Pigment Blue 15:34, C.I. Pigment Blue 15:4, C.I. Pigment Blue 16, C.I. Pigment Blue 18, C.I. Pigment Blue 22, C.I. Pigment Blue 25, C.I. Pigment Blue 60, C.I. Pigment Blue 65, C.I. Pigment Blue 66, C.I. Vat Blue 4, and C.I. Vat Blue 60.

The magenta ink, that is part of the ink set of the present disclosure, includes a magenta pigment. Said magenta pigment will provide a magenta color to the magenta ink. Examples of suitable magenta pigments are organic pigment that include C.I. Pigment Red 1, C.I. Pigment Red 2, C.I. Pigment Red 3, C.I. Pigment Red 4, C.I. Pigment Red 5, C.I. Pigment Red 6, C.I. Pigment Red 7, C.I. Pigment Red 8, C.I. Pigment Red 9, C.I. Pigment Red 10, C.I. Pigment Red 11, C.I. Pigment Red 12, C.I. Pigment Red 14, C.I. Pigment Red 15, C.I. Pigment Red 16, C.I. Pigment Red 17, C.I. Pigment Red 18, C.I. Pigment Red 19, C.I. Pigment Red 21, C.I. Pigment Red 22, C.I. Pigment Red 23, C.I. Pigment Red 30, C.I. Pigment Red 31, C.I. Pigment Red 32, C.I. Pigment Red 37, C.I. Pigment Red 38, C.I. Pigment Red 40, C.I. Pigment Red 41, C.I. Pigment Red 42, C.I. Pigment Red 48(Ca), C.I. Pigment Red 48(Mn), C.I. Pigment Red 57(Ca), C.I. Pigment Red 57:1, C.I. Pigment Red 88, C.I. Pigment Red 112, C.I. Pigment Red 114, C.I. Pigment Red 122, C.I. Pigment Red 123, C.I. Pigment Red 144, C.I. Pigment Red 146, C.I. Pigment Red 149, C.I. Pigment Red 150, C.I. Pigment Red 166, C.I. Pigment Red 168, C.I. Pigment Red 170, C.I. Pigment Red 171, C.I. Pigment Red 175, C.I. Pigment Red 176, C.I. Pigment Red 177, C.I. Pigment Red 178, C.I. Pigment Red 179, C.I. Pigment Red 184, C.I. Pigment Red 185, C.I. Pigment Red 187, C.I. Pigment Red 202, C.I. Pigment Red 209, C.I. Pigment Red 213, C.I. Pigment Red 219, C.I. Pigment Red 224, C.I. Pigment Red 245, C.I. Pigment Red 282, C.I. Pigment Red 286, C.I.

In some examples, the ink set ink further comprises one or more inks selected from the group consisting of an orange ink with an orange pigment, a violet ink with a violet pigment and a green ink with a green pigment. The ink set ink can include an orange and/or a violet and/or a green ink.

The ink set can further include a violet ink. Said violet ink comprises a violet pigment that will impart a violet color to the ink. Examples of suitable violet organic pigments include C.I. pigment Violet 19, C.I. Pigment Violet 23, C.I. Pigment Violet 32, C.I. Pigment Violet 33, C.I. Pigment Violet 36, C.I. Pigment Violet 38, C.I. Pigment Violet 43, C.I. Pigment Violet 50, and C.I. Pigment Violet 55.

In some other examples, the ink set can further include a green ink. Said green ink comprises a green pigment that will impart a green color to the ink. Some examples of green organic pigments include C.I. Pigment Green 1, C.I. Pigment Green 2, C.I. Pigment Green 4, C.I. Pigment Green 7, C.I. Pigment Green 8, C.I. Pigment Green 10, C.I. Pigment Green 36, and C.I. Pigment Green 45.

In yet some other examples, the ink set can further include an orange ink. Said orange ink comprises an orange pigment that will impart an orange color to the ink. Some examples of orange organic pigments include C.I. Pigment Orange 1, C.I. Pigment Orange 2, C.I. Pigment Orange 5, C.I. Pigment Orange 7, C.I. Pigment Orange 13, C.I. Pigment Orange 15, C.I. Pigment Orange 16, C.I. Pigment Orange 17, C.I. Pigment Orange 19, C.I. Pigment Orange 24, C.I. Pigment Orange 34, C.I. Pigment Orange 36, C.I. Pigment Orange 38, C.I. Pigment Orange 40, C.I. Pigment Orange 43, C.I. Pigment Orange 64, C.I. Pigment Orange 66, and C.I. Pigment Orange 71.

The pigments that are present in the black, yellow, magenta or cyan ink composition of the ink set, may be dispersed by an anionic polymer (i.e., anionic polymeric dispersant). In some examples, the pigments, that are part of black, yellow, cyan, and/or magenta inks, are part of the are dispersed by the anionic polymer. The dispersant may be present in an amount ranging from about 0.1 wt % to about 5 wt % of a total wt % of the liquid ink. The above-described pigments can be dispersed into a polymeric dispersion. The polymeric dispersion can assist in dispersing the pigment in a solvent system. In an example, the dispersant may be styrene-acrylic-type dispersants such as acrylic dispersants having i) hydrophilic monomers including acidic monomers, and ii) hydrophobic monomers. The acid number of the dispersant may range from about 120 mg/g to about 300 mg/g. The styrene-acrylic-type dispersants can be water-soluble or partially water-soluble (since it is desired that the dispersant resides at the interface between the water and the pigment). A "partial" water solubility would ensure that there is a driving force for the polymer to adsorb on the pigment surface.

Acidic monomers that may be used in the acrylic dispersant may include, for example, acrylic acid, methacrylic acid, ethacrylic acid, dimethylacrylic acid, maleic anhydride, maleic acid, vinylsulfonate, cyanoacrylic acid, vinylacetic acid, allylacetic acid, ethylidineacetic acid, propylidineacetic acid, crotonoic acid, fumaric acid, itaconic acid, sorbic acid, angelic acid, cinnamic acid, styrylacrylic acid, citraconic acid, glutaconic acid, aconitic acid, phenylacrylic acid, acryloxypropionic acid, aconitic acid, phenylacrylic acid, acryloxypropionic acid, vinylbenzoic acid, N-vinylsuccinamidic acid, mesaconic acid, methacroylalanine, acryloylhydroxyglycine, sulfoethyl methacrylic acid, sulfopropyl acrylic acid, styrene sulfonic acid, sulfoethylacrylic acid, 2-methacryloyloxymethane-1-sulfonic acid, 3-methacryoyloxypropane-1-sulfonic acid, 3-(vinyloxy)propane-1-sulfonic acid, ethylenesulfonic acid, vinyl sulfuric acid, 4-vinylphenyl sulfuric acid, ethylene phosphonic acid, vinyl phosphoric acid, vinyl benzoic acid, 2-acrylamido-2-methyl-1-propanesulfonic acid, and combinations thereof. Examples of the hydrophobic monomers that can be polymerized in the acrylic dispersant may include styrene, p-methyl styrene, methyl methacrylate, hexyl acrylate, hexyl methacrylate, butyl acrylate, butyl methacrylate, ethyl acrylate, ethyl methacrylate, propyl acrylate, propyl methacrylate, octadecyl acrylate, octadecyl methacrylate, stearyl methacrylate, vinylbenzyl chloride, isobornyl acrylate, tetrahydrofurfuryl acrylate, 2-phenoxyethyl methacrylate, ethoxylated nonyl phenol methacrylate, isobornyl methacrylate, cyclohexyl methacrylate, t-butyl methacrylate, n-octyl methacrylate, lauryl methacrylate, tridecyl methacrylate, alkoxylated tetrahydrofurfuryl acrylate, isodecyl acrylate, isobornylmethacrylate, and combinations thereof. Some non-limiting commercial examples of useful styrene acrylic polymers are sold under the trade names Joncryl® (S.C. Johnson Co.), Ucar® (Dow Chemical Co.), Jonrez® (MeadWestvaco Corp.), and Vancryl® (Air Products and Chemicals, Inc.).

In some examples, surface-treated pigments can be used herein, such surface-treated pigments can be, for examples, Cabojet 265 magenta and/or Cabojet 250C cyan pigments. When used in the ink formulation, the ink compositions would not contain polymeric dispersants. Pigment stabilization might come from chemically grafted anionic, nonionic, amphoteric, or cationic small molecules that are present on the pigment surface. In some examples, the chemical treatment is anionic. In some examples, the pigment might also be dispersed by other means, including surfactant-dispersed, polymer encapsulated, and polymer grafted dispersions.

White Pigment

The white ink composition that are part of the ink set comprise a white pigment. in some examples, the white pigment is a white metal oxide pigment. such white metal oxide pigment is dispersed in an ink vehicle. The term "white metal oxide pigment" refers to pigments that impart a white color to an ink, but may in fact be essentially colorless pigments with a high refractive index, e.g., greater than 1.6 or greater than 1.8. Titanium dioxide ($TiO_2$) is an example of such a pigment that imparts white color to an ink, but when viewed on a particle by particle basis, can appear colorless. This pigment solid can provide a white color due to its large size and refractive index, e.g., refractive index of 1.8 to 3.0. These pigments can also have a bulk density from 3.0 to 4.5, for example. White pigments are in the size range of 200 nm to 700 nm to scatter visible light. Thus, the same properties that make this pigment a good white colorant for use in an ink also contributes to the settling characteristics for the pigment in the ink, e.g., the size of pigment and the bulk density of pigment tends to settle rather quickly. As a partial solution, coating the white metal oxide pigment with alumina and associating the surface with polymeric dispersant can be carried out. Furthermore, however, by adding amphoteric alumina particles and monovalent salt, when settling does occur, the white colorant can be easily resuspended from the white flocculated colorant mass in preparation for inkjet application. Thus, when resuspended, a homogenous or evenly distributed pigment dispersion can be readily formed from the flocculated colorant mass.

In further detail, the "white" pigment provides much of the white coloration to the ink, though without the other ingredients in the ink, individual pigment particles may have some transparency or translucency. Examples of white metal oxide pigments that can be used include titanium dioxide particles, zinc oxide particles, zirconium oxide particles, combinations thereof, or the like. In one specific example, the white metal oxide pigment can be titanium dioxide ($TiO_2$), and even more specifically, rutile. Thus, the white inks of the present disclosure are based on transparent metal oxide pigment particles with very high refractive index, that when spaced appropriately, provide very opaque and white print layers.

Pigments with high light scattering capabilities, such as these, can be selected to enhance light scattering and lower transmittance, thus increasing opacity. White metal oxide pigments can have a particulate size from about 200 nm to 700 nm, or from 300 nm to about 600 nm, or more typically, from about 400 nm to 550 nm, and in still another example, from about 180 nm to 400 nm. The combination of these pigments within these size ranges, appropriately spaced from one another with ingredients such as the alumina coating, amphoteric alumina particles, and latex particles, high opacity can be achieved at relatively thin thickness, e.g., 5 gsm to 60 gsm or 5 gsm to 50 gsm after removal of water and other solvent(s) from the printed ink and fixer film. In some examples, the white pigment dispersed in the ink vehicle; is present in an amount representing from about 5 wt % to about 25 wt % of the total ink weight.

In some other examples, the white metal oxide pigment has an average particle size ranging from about 200 nm to about 700 nm, and includes titanium dioxide particles, zinc oxide particles, zirconium oxide particles, or combinations thereof.

In some other examples, the white pigment dispersed in the ink vehicle has an alumina coating. The white metal oxide pigment can thus be an alumina-coated pigment. Thus, in some examples, the white metal oxide pigment has an alumina coating and is present in an amount representing from about 5 wt % to about 25 wt % of the total ink weight. The white metal oxide pigment can have an alumina coating which is made of alumina or of an admixture of alumina and silica.

Examples of alumina-coated pigment that can be used include Ti-Pure® R960, available from Chemours, which has an alumina content of about 3.3 wt % and an amorphous silica content of about 5.5 wt % based on the pigment content, and thus, when milled with polymeric dispersant, can form the suspended flocs, which may be easily resuspended when formulated with the amphoteric alumina particles and monovalent salts of the present disclosure. Other coated pigments that can be used include TR® 50 (2.6 wt % alumina coating), TR® 52 (3.4 wt % alumina coating), TR60 (3.1 wt % alumina coating), TR® 90 (4 wt % alumina coating), and TR® 93 (3.9 wt % alumina coating), each from Huntsman Chemical; Ti-Pure® R900 (4.3 wt % alumina coating) and Ti-Pure® R931 (6.4 wt % alumina coating), each available from Chemours; and CR®-813 (3.5 wt % alumina coating) and CR®-828 (3.5 wt % alumina coating), each available from Chemours. Notably, these coating weight percentages are based on the pigment weight, and furthermore, silica may also be included with these coatings at various concentrations either greater than or less than the alumina content. In further detail regarding the alumina coating that can be applied to the white metal oxide pigment, any of a number of alumina compositions can be used. The alumina can be coated on the pigment by precipitation from a liquid phase, and in some examples, there are commercially available alumina-containing TiO2 pigments (or other white metal oxide pigments) that can be used. These commercially available pigments which include alumina can be milled with polymeric dispersant, as described in greater detail hereinafter. Thus, the white metal oxide coating can include alumina, such as alumina or an admixture of alumina and silica, e.g., amorphous-silicate (aluminosilicate). In accordance with this, an ink of the present disclosure can include an aqueous ink vehicle, and from 5 wt % to 25 wt % of white metal oxide pigment having an alumina coating, e.g., an alumina-containing coating of alumina or of amorphous-silicate (aluminosilicate which is a combination of both alumina and silica), etc.

In one example, a white metal oxide pigment, such as TiO2, can have an alumina-containing coating, aluminosilicate which is an amorphous silicate coating with both alumina and silica. Chemours® R900 is an example of a pigment that has an alumina coating, and Chemours® R960 is an example of a pigment that has an amorphous silicate coating with both alumina and amorphous silica. Thus, in accordance with examples of the present disclosure, a white metal oxide pigment can be treated with alumina (with or without silica) to form a coating, and the coated pigment can be further dispersed with a polymeric dispersing agent with added monovalent or divalent metal salt and amphoteric alumina particles also included therein.

Metal Salt

In some examples, the white ink can further include from 0.2 wt % to 1.5 wt % monovalent metal salt, or from 0.001 wt % to 0.3 wt % divalent metal salt, or both. In one example, the monovalent salt can be present at from 0.2 wt % to 1.5 wt %, or from 0.3 wt % to 0.7 wt %, or from 0.4 wt % to 0.55 wt %. In another example, the divalent salt can be present at from 0.001 wt % to 0.3 wt %, or from 0.01 wt % to 0.15 wt %, or from 0.05 wt % to 0.13 wt %. Example monovalent salts can include $K_2SO_4$, $K_2CO_3$, KCl, KBr, $KNO_3$, $Na_2SO_4$, $Na_2CO_3$, NaCl, NaBr, $NaNO_3$, $Li_2SO_4$, $Li_2CO_3$, LiCl, LiBr, $LiNO_3$, $NaH_2PO_4$, $Na_2HPO_4$, or a combination thereof. Example divalent salts can include $Ca(NO_3)_2$, $Mg(NO_3)_2$, $CaCl_2$, $MgCl_2$, or a combination thereof. Notably, the term "monovalent" refers to a single charge on the metal cation, such as potassium or sodium, and does not refer to the anion, such as nitrate or sulfate. "Divalent" also refers to the metal cation, not the corresponding anion. In some other examples, the ink of the present disclosure can comprise a monovalent metal that is selected from the group consisting of $K_2SO_4$, $K_2CO_3$, KCl, KBr, $KNO_3$, $Na_2SO_4$, $Na_2CO_3$, NaCl, NaBr, $NaNO_3$, $Li_2SO_4$, $Li_2CO_3$, LiCl, LiBr, $LiNO_3$, $NaH_2PO_4$, $Na_2HPO_4$, and a combination thereof. In yet some other examples, the ink of the present disclosure can comprise a divalent metal salt metal that is selected from the group consisting of $Ca(NO_3)_2$, $Mg(NO_3)_2$, $CaCl_2$, $MgCl_2$, and a combination thereof.

Amphoteric Alumina Particles

In another example, the ink can further include from 0.05 wt % to 0.5 wt % of amphoteric alumina particles dispersed in the aqueous ink vehicle. The amphoteric alumina particles can have an average particles size from 2 nm to less than less than 100 nm, for example. In one specific example, a suitable amphoteric alumina particles (boehmite) nano-particle dispersion can be prepared by mixing Dispal® 23N4-80® alumina powder pre-acidified with nitric acid (available from Sasol GmbH) in a mixing vat with a propeller mixer. Dispal 23N4-80 is about 80 wt % Alumina $Al_2O_3$, 1.65 wt % nitrate, and the balance water, with a combination of adsorbed water and the mineral represented by the formula AlO(OH). In one non-limiting example, the metal oxide pigments can have an average particulate size from 200 nm to 700 nm. A dispersant can also be associated with the surface of the metal oxide pigment. Thus, in some examples, the inkjet ink composition according to the ink set of the present disclosure has a dispersant associated with the surface of the white metal oxide pigment.

Ink Vehicle

The inkjet ink set of the present disclosure comprises a black ink with a black pigment, a yellow ink with a yellow pigment, a cyan ink with a cyan pigment, a magenta ink with a magenta pigment and, a white ink with a white pigment. All inks are dispersed in an ink vehicle. In some examples, the inkjet ink composition includes water in an amount of at least about 20 wt %, for example, at least about 30 wt %, or at least about 40 wt %, or at least about 50 wt %, by total weight of the inkjet ink composition. In some examples, the inkjet ink composition includes up to about 80 wt % water, for example up to about 75 wt %, up to about 60 wt %, or up to about 55 wt %, by total weight of the inkjet ink composition. In some examples, the inkjet ink composition includes water in an amount ranging from about 20 wt % to about 85 wt % by total weight of the inkjet ink composition.

Co-Solvent

In some examples, the ink vehicle that are part of the inks, comprised in the inkjet ink set of the present disclosure, includes water and a co-solvent (for example a blend of co-solvents). In some examples, the inkjet ink composition that are part of inkjet ink set of the present disclosure comprises co-solvent in an amount of at least about 1 wt %, for example at least about 5 wt %, or at least about 10 wt % by total weight of the composition. In some examples, the inkjet ink composition comprises the co-solvent in an amount up to about 50 wt %, for example up to about 40 wt %, or up to about 35 wt % by total weight of the composition. In some examples, the inkjet ink composition comprises a co-solvent in an amount of about 1 to about 50 wt % by total weight of the composition, for example from about 5 to about 40 wt % of the composition, or about 10 to about 35 wt % of the total weight of the composition.

In some examples, the co-solvent is a blend including a solvent having a boiling point ranging from about 170° C. to about 215° C. and a solvent having a boiling point of about 220° C. or more. The solvent having a boiling point ranging from about 170° C. to about 215° C. may itself be a blend of solvents, where each solvent of the blend has a boiling point ranging about 170° C. to about 215° C. The solvent having a boiling point of about 220° C. or more may also be a blend of solvents, where each solvent of the blend of solvents has a boiling point of about 220° C. or more. When the blend including a solvent having a boiling point ranging from about 170° C. to about 215° C. and a solvent having a boiling point of about 220° C. or more is used, the inkjet ink composition may include from about 10 wt % to about 40 wt % by total weight of the inkjet ink composition of the solvent having the boiling point in the range of about 170° C. to about 215° C. and from about 0.1 wt % to about 8 wt % by total weight of the inkjet ink composition of the solvent having the boiling point of about 220° C. or more.

In some examples, the ink vehicle that are part of the inks, comprised in the inkjet ink set of the present disclosure, includes water and a co-solvent, the co-solvent being a blend including a solvent having a boiling point ranging from about 170° C. to about 215° C. and a solvent having a boiling point of about 220° C. or more In some other examples, the co-solvent is a blend including any two or more of a solvent having a boiling point ranging from about 170° C. to about 215° C., a solvent having a boiling point of ranging from about 220° C. to about 285° C., and a solvent having a boiling point greater than about 285° C. and/or being insoluble in water. In these example, the inkjet ink composition may include from about 10 wt % to about 40 wt % by total weight of the inkjet ink composition of the solvent having the boiling point in the range of about 170° C. to about 215° C., and/or from about 0.5 wt % to about 8 wt % of the solvent having the boiling point in the range of about 220° C. to about 285° C., and/or from about 0.1 wt % to about 4 wt % of the solvent having the boiling point of greater than about 285° C. and/or being insoluble in water. As one example, the co-solvent may include the solvent having a boiling point ranging from about 170° C. to about 215° C. and the solvent having the boiling point ranging from about 220° C. to about 285° C. As another example, the co-solvent may include the solvent having a boiling point ranging from about 170° C. to about 215° C. and the solvent having a boiling point of greater than about 285° C. and/or being insoluble in water. As still another example, the co-solvent may include the solvent having a boiling point ranging from about 170° C. to about 215° C., and the solvent having a boiling point ranging from about 220° C. to about 285° C., and the solvent having a boiling point of greater than about 285° C. and/or being insoluble in water.

Some examples of the ink vehicle include the solvent having a boiling point ranging from about 170° C. to about 215° C. In an example, this solvent has a boiling point ranging from about 180° C. to about 215° C. In some examples, this solvent is selected from an aliphatic alcohol, for example a primary aliphatic alcohol, a secondary aliphatic alcohol, or a tertiary aliphatic alcohol. The aliphatic alcohol may be a diol. In some examples, this solvent is an aliphatic alcohol (specifically a diol) containing 10 carbons or less, for example 8 carbons or less, or 6 carbons or less.

Specific examples of the solvent having a boiling point ranging from about 170° C. to about 215° C. may be selected from the group consisting of 1,2-propanediol, 1,2-butanediol, ethylene glycol, 2-methyl-2,4-pentanediol, 1,3-butanediol, 2-methyl-1,3-propanediol, 1,3-propanediol, and combinations thereof. In some examples the solvent having a boiling point ranging from about 170° C. to about 215° C. is selected from the group consisting of 1,2-propanediol, 1,2-butanediol, ethylene glycol, 2-methyl-2,4-pentanediol, 1,3-butanediol, and combinations thereof. In some other examples, the first solvent is 1,2-butanediol. The boiling points of 1,2-propanediol, 1,2-butanediol, ethylene glycol, 2-methyl-2,4-pentanediol, 1,3-butanediol, 2-methyl-1,3-propanediol and 1,3-propanediol are listed in Table 1 below.

TABLE 1

| Solvent | Boiling point (° C.) |
| --- | --- |
| propylene glycol (1,2-propanediol) | 188 |
| 1,2-butanediol | 194 |
| ethylene glycol | 196 |
| 2-methyl-2,4-pentanediol (hexylene glycol) | 198 |
| 1,3-butanediol | 203 |
| 2-methyl-1,3-propanediol (MPdiol) | 213 |
| 1,3-propanediol | 214 |

In some examples, the inkjet ink composition includes at least about 5 wt % (by total weight of the inkjet ink composition) of the solvent having a boiling point ranging from about 170° C. to about 215° C. In some examples, the inkjet ink composition includes up to about 40 wt % (by total weight of the inkjet ink composition) of the solvent having a boiling point ranging from about 170° C. to about 215° C. Some examples of the ink vehicle include the solvent having a boiling point of about 220° C. or more. In some instance, this solvent may be defined having a boiling point ranging from about 220° C. to about 285° C. In other instances, this solvent may be defined as having a boiling point of greater than about 285° C. and/or as being insoluble in water. In still other examples, this solvent may include a blend of the solvent having a boiling point ranging from about 220° C. to about 285° C. and the solvent having a boiling point of greater than about 285° C. and/or being insoluble in water. The solvent having the boiling point ranging from about 220° C. to about 285° C. may be selected from alcohols (including aliphatic alcohols and aromatic alcohols), esters, glycol ethers, di- and tri-alkylene glycols, amides, lactams and sulfones. In some examples, this solvent is selected from aliphatic alcohols (including primary, secondary and tertiary aliphatic alcohols, including diols), aromatic alcohols, esters, alkylene glycol alkyl ethers (including di-, tri- and tetra-alkylene glycol alkyl ethers), glycol aryl ethers (such as alkylene glycol aryl ethers, including di- and tri-alkylene glycol aryl ethers), di- and tri-alkylene glycols, lactams (such as 2-pyrrolidinone), and sulfones (such as sulfolane or other cyclic sulfones). In some examples, the aliphatic alcohols, esters, glycol alkyl ethers, and glycol aryl ethers may have 20 carbon atoms or less (e.g., 12 carbons or less, 10 carbons or less, etc.).

Specific examples of the solvent having the boiling point ranging from about 220° C. to about 285° C. may be selected from the group consisting of ethylene glycol 2-ethylhexyl ether, dipropylene glycol n-butyl ether, diethylene glycol n-butyl ether, propylene glycol phenyl ether, 2-pyrrolidinone, tripropylene glycol methyl ether, 2,2,4-trimethyl-1,3-pentanediol mono-isobutyrate, tripropylene glycol n-propyl ether, tripropylene glycol n-butyl ether, tetraethylene glycol dimethyl ether, and dipropylene glycol phenyl ether. In some examples, the solvent having the boiling point ranging from about 220° C. to about 285° C. may be selected from the group consisting of 2-pyrrolidinone, tripropylene glycol methyl ether, and tripropylene glycol n-butyl ether. The boiling points of some examples of the solvent having the boiling point ranging from about 220° C. to about 285° C. are listed in Table 2 below.

TABLE 2

| Solvent | Boiling point (° C.) |
| --- | --- |
| ethylene glycol 2-ethylhexyl ether (Eastman EEH) | 229 |
| dipropylene glycol n-butyl ether (Dowanol ® DPnB) | 230 |
| diethylene glycol n-butyl ether (Butyl Carbitol) | 230 |
| propylene glycol phenyl ether (Dowanol ® PPh) | 243 |
| 2-pyrrolidinone | 245 |
| tripropylene glycol methyl ether (Dowanol ® TPM) | 245 |
| 2,2,4-trimethyl-1,3-pentanediol monoisobutyrate (TEXANOL ®) | 255-261.5 |
| tripropylene glycol n-propyl ether | 261 |
| tripropylene glycol n-butyl ether (Dowanol ® TPnB) | 274 |
| tetraethylene glycol dimethyl ether (tetraglyme) | 275 |
| dipropylene glycol phenyl ether (Dowanol ® DiPPh) | 280 |

In some examples, the inkjet ink composition includes at least about 0.1 wt % (by total weight of the inkjet ink composition) of the solvent having a boiling point ranging from about 220° C. to about 285° C. In some examples, the inkjet ink composition includes up to about 8 wt % (by total weight of the inkjet ink composition) of the solvent having a boiling point ranging from about 220° C. to about 285° C.

The inkjet ink composition disclosed herein may also include the solvent having a boiling point of greater than about 285° C. and/or being insoluble in water. In the examples disclosed herein, curing may remove at least a portion of the water, the solvent having a boiling point ranging from about 170° C. to about 215° C., and the solvent having a boiling point ranging from about 220° C. to about 285° C. When the solvent having a boiling point of greater than about 285° C. is used, it may be water soluble (i.e., having a solubility of greater than about 10% in water). In some examples, the solubility of the water-soluble solvent having a boiling point of greater than about 285° C. may be greater than about 90%. The water-soluble solvent having a boiling point of greater than about 285° C. may be present in the inkjet ink composition in an amount ranging from about 0.1 wt % to about 4 wt % by total weight of the inkjet ink composition.

Alternatively, the solvent having a boiling point of greater than about 285° C. may be water insoluble. In still other examples, instead of a water soluble or insoluble solvent having a boiling point of greater than about 285° C., a water insoluble solvent having a lower boiling point may be included. The term "insoluble," as used herein, refers to a solvent having a water solubility of less than about 10%, for example less than about 5%, less than about 4.5%, or less than about 4%. In some examples, it may be desirable that the water insoluble solvent having a water solubility of at least 1%. The solubility of the solvent in water may be determined as the amount of solvent by weight which may be dissolved in 100 g of water (under conditions of standard temperature and pressure) to produce a saturated solution. The solubility of the solvent in water may alternatively be determined by referring to data provided by the manufacturer. The water insoluble solvent having a boiling point of greater than about 285° C. may be present in the inkjet ink composition in an amount ranging from about 0.1 wt % to about 1 wt % by total weight of the inkjet ink composition.

The solvent having a boiling point of greater than about 285° C. and/or being insoluble in water may be selected from the group consisting of esters (such as citrates, e.g. triethyl citrate, and 2,2,4-trimethyl-1,3-pentanediol monoisobutyrate), glycol esters, glycol ether-esters, glycol ethers, lactams, phosphate ethers, and combinations thereof. In some examples, solvent having a boiling point of greater than about 285° C. and/or being insoluble in water may be selected from the group consisting of esters containing 30 carbons or less; glycol esters, such as alkylene glycol esters containing 30 carbons or less; glycol ether-esters (such as triethylene glycol n-pentyl ether benzoate, triethylene glycol n-hexyl ether benzoate, tripropylene glycol n-butyl ether benzoate, tripropylene glycol n-pentyl ether benzoate, dipropylene glycol n-butyl ether benzoate, dipropylene glycol 2-ethylhexyl ether benzoate, and dipropylene glycol phenyl ether benzoate); glycol ethers (which may contain 30 carbons or less), such as glycol aryl ethers (e.g., alkylene glycol aryl ethers, glycol phenyl ethers, etc.) and glycol alkyl ethers (e.g. alkylene glycol alkyl ethers), lactams, and phosphate ethers.

In some examples, the solvent having a boiling point of greater than about 285° C. and/or being insoluble in water is selected from the group consisting of Benzoflex® 2088 (high solvating plasticizer from Eastman Chemical Co., boiling point 356° C.), Benzoflex® 50 (plasticizer from Eastman Chemical Co., boiling point 370° C.), Benzoflex®LA-705 (plasticizer from Eastman Chemical Co., boiling point>350° C.), dibutyl sebacate (boiling point 344.5° C.), Dowanol® DiPPh (dipropylene glycol phenyl ether from The Dow Chemical Co., boiling point 280° C.), Eastman® 168 (non-phthalate plasticizer from Eastman Chemical Co., boiling point 375° C.), Eastman® EEH (ethylene glycol 2-ethylhexyl ether from Eastman Chemical Co., boiling point 226° C.), Eastman® TXIB Formulation Additive (trimethyl pentanyl diisobutyrate) from Eastman Chemical Co., boiling point 281° C.), Hexamoll® DINCH® (1,2-cyclohexane dicarboxylic acid, 1,2-diisononyl ester from BASF Corp.), Loxanol® CA 5310 (propylene glycol mono oleate from BASF Corp., boiling point 284° C.), Loxanol® CA 5320 (propylene glycol monoester of C-18 fatty acids from BASF Corp.), Optifilm® 300 (C16H30O4 from Eastman Chemical Co., boiling point 281° C.), Optifilm® 400 (triethylene glycol bis(2-ethylhexanoate) from Eastman Chemical Co., boiling point 374-381° C.), Texanol® ester alcohol (2,2,4-trimethyl-1,3-pentanediol monoisobutyrate from Eastman Chemical Co., boiling point 255-261.5° C.), triethyl citrate (boiling point 294° C.), triethylene glycol bis(2-ethylhexanoate) (boiling point 344° C.), tris(2-butoxyethyl)phosphate (boiling point 200-230° C.), UCAR® Filmer IBT (2,2,4-trimethyl-1,3-pentanediol monoisobutyrate from The Dow Chemical Co., boiling point 255° C.), Velate® 368 (2-ethylhexylbenzoate from Eastman Chemical Co., boiling point 297° C.), and N-(2-hydroxyethyl)-2-pyrollidinone (boiling point 140-142° C.).

In some examples, the inkjet ink composition includes at least about 0.05 wt % (by total weight of the inkjet ink composition) of the solvent having a boiling point of greater than about 285° C. and/or being insoluble in water. In some examples, the inkjet ink composition includes up to about 4 wt % (by total weight of the inkjet ink composition) of the solvent having a boiling point of greater than about 285° C. and/or being insoluble in water.

The ink vehicle may also include a variety of additional components suitable for inkjet ink compositions. These additional components may include surfactants (for example, suitable surfactants may be selected form alkyl polyethylene oxides, alkyl phenyl polyethylene oxides, polyethylene oxide block copolymers, acetylenic polyethylene oxides, polyethylene oxide (di)esters, polyethylene oxide amines, protonated polyethylene oxide amides, dimethicone copolyols, fluoroalkyl polyethylene oxides, substituted amine oxides, and the like), buffers, biocides (such as Nuosept® (Nudex Inc.), Ucarcide® (Union carbide Corp.), Vancide® (R.T. Vanderbilt Co.), Proxel® (Lonza), and combinations thereof), viscosity modifiers, sequestering agents (such as EDTA (ethylene diamine tetraacetic acid) or Trilon® M (trisodium salt of methylglycinediacetic acid from BASF Corp.) or sodium salt of polyacrylic acid), stabilizing agents, wetting agents, anti-kogation agents (e.g., for thermal inkjet inks), and/or humectants. In some examples, the ink vehicle that are part of the inks, comprised in the inkjet ink set of the present disclosure, further includes surfactants. Some specific examples of suitable surfactants include water-soluble, non-ionic surfactants (e.g., Tergitol® TMN-6, Tergitol® 15S7, and Tergitol® 15S9 from The Dow Chemical Company), a non-ionic fluoro or silicone surfactant (e.g., Capstone® fluorosurfactants from DuPont, previously known as Zonyl FSO, or BYK-348 from BYK-Chemie), and combinations thereof. Surfactants, when present, may be included in an amount ranging from about 0.01 wt % to about 10 wt % (by total weight of the inkjet ink composition), and the other additives may be present in a total amount ranging from 0 wt % to about 20 wt % (by total weight of the inkjet ink composition).

In one example, potassium sulfate can be added to the ink vehicle, as it or another monovalent salt may already be present as an electrolyte (in lower concentrations) as a byproduct of a potassium persulfate latex initiator and because of its inertness. However, it is understood that the residual amounts of this salt that may be inherently present can be less than the concentration of monovalent salt described in conjunction the present disclosure, e.g., from 5 mM to 17 mM monovalent salt based on ionic strength. Thus, the monovalent salt can be affirmatively added to reach an appropriate concentration that improves or loosens the sediment upon settling. As potassium cations may be present anionically charged particles, salt can be added at a range that is equivalent to 3.3 mM to 8 mM of potassium ions or more. Suitable monovalent metal salts that can be used include $K_2SO_4$, as mentioned, as well as $K_2CO_3$, KCl, KBr, $KNO_3$, $Na_2SO_4$, $Na_2CO_3$, NaCl, NaBr, $NaNO_3$, $Li2SO_4$, $Li_2CO_3$, LiCl, LiBr, $LiNO_3$ $NaH_2PO_4$, $Na_2HPO_4$, or combinations thereof. Alternatively (or additionally), divalent metal salt can be added to bring up the ionic strength of the salt in the ink to 1 mM to 30 mM. In one example, as calcium cations may associate with anionically charged particles, salt can be added at a range that is equivalent to 1/3 to 30/3 mM of calcium ions, without limitation. Suitable salts that can be used include $Ca(NO_3)_2$, as mentioned, as well as $Mg(NO_3)_2$, $CaCl_2$, and $MgCl_2$.

System for Printing an Ink Set

In some examples, the inks, that are part of the ink set disclosed herein, are established on at least a portion of a print media, or substrate or printable medium, to form an image (i.e., text, graphics, etc.) using a printing technique. The amount of ink used depends, at least in part, on the desirable image to be formed. The ink composition may be deposited, established, or printed on the printable medium using any suitable printing device. In some examples, the ink composition is applied to the printable medium via inkjet printing techniques. The ink may be deposited, established, or printed on the medium via continuous inkjet printing or via drop-on-demand inkjet printing, which includes thermal inkjet printing and piezoelectric inkjet printing. The resulting printed image will have, for examples, enhanced image quality and image permanence.

The inventions disclosure relates thus to a system for printing an ink set, comprising an ink set comprising a black ink with a black pigment; a yellow ink with a yellow pigment; a cyan ink with a cyan pigment; a magenta ink with a magenta pigment, and a white ink with a white pigment wherein at least one of the ink further contains a latex binder that is dispersed in the ink vehicle, and that includes a first heteropolymer including two or more aliphatic (meth)acrylate ester monomers or two or more aliphatic (meth)acrylamide monomers; and a second heteropolymer including a cycloaliphatic monomer and an aromatic monomer; and an inkjet printer having the ink set loaded therein.

In some other examples, the system for printing an ink set comprises the ink set as defined above and an inkjet printer having with a white ink with a white pigment and one or more ink selected from the group consisting of a cyan inkjet ink, a magenta inkjet ink, a yellow inkjet ink, a black inkjet ink, an orange inkjet ink, a violet inkjet ink, and a green inkjet ink.

The system for printing an ink set is illustrated in FIG. 1. The system for printing an ink set, or inkjet printing system 100, include a printer 110 and an ink set comprising a black ink 201 comprising a black pigment; a yellow ink 202 comprising a yellow pigment; a cyan ink 203 comprising a cyan pigment; and a magenta ink 204 comprising a magenta pigment, a white ink 205 comprising a white pigment. As shown in FIG. 1, the inkjet printing system 10 includes a printer 11 having, for example, fives inkjet fluid ejectors 121, 122, 123, 124 and 125. Each of the fluid ejectors 121, 122, 123, 124 and 125 are fluidically coupled to respective chambers 131, 132, 133, 134 and 135 which are operatively positioned inside the printer 110. In an example, one of the chambers of the system (e.g., the chamber 131) contains one of the inks of the ink set (such as the black ink 201), while another one of the chambers (e.g., the chamber 132) contains another one of the inks of the ink set (such as the yellow ink 202). The chambers 133, 134 and 135 would contain respectively, for examples, the cyan ink 203, the magenta ink 204 and the white ink 205. In some examples, the inkjet printing system 100 comprises a first ink chamber 131 including a black ink 201, a second ink chamber 132 including a yellow ink 202; a third ink chamber 133 including a cyan ink 203; a fourth ink chamber 134 including a magenta ink 204 and a fifth ink chamber 135 including a white ink 205. Each of the fluid ejectors 121, 122, 123, 124 and 125 are configured to eject its respective ink onto a surface 310 of a print media 300, where the inks are retrieved from their respective chambers 201, 202, 203, 204 and 205 during printing. In some examples, the chambers 201, 202, 203, 204 and 205 are ink reservoirs that are in fluid communication with fluid ejectors 121, 122, 123, 124 and 125 that are inkjet printheads. Said fluid communication can be done thought a fluid conduit. In some other examples, the chambers 201, 202, 203, 204 and 205 are ink reservoirs and are part of inkjet cartridges, the ink reservoirs are in direct fluid communication with the inkjet printhead.

It is to be understood that the printer 110 may also include additional fluid ejectors (not shown in FIG. 1), each of which is fluidically coupled to at least one other chamber (also not shown in FIG. 1). For example, the inkjet printing system 100 may include an ink set having six inks, each of which is stored in a respective chamber. As such, at least one other chamber may contain another colored ink (e.g., a green ink), if desired. The printer 110 would thus include at least six fluid ejectors and six chambers. However, it is to be understood that any suitable or desired number of fluid ejectors and chambers may be used. Further, it is to be understood that the ink chambers may be in fluid communication with a single fluid ejector, or may be in fluid communication with their own respective fluid ejectors.

The ink set disclosed herein may also include additional inks. Non-limiting examples of such inks include gray inks, orange inks, green inks, blue inks, violet inks, red inks, colorless inks, and combinations thereof. It is to be understood that any of these additional colored inks may be incorporated with light, medium or dark shades, as is desirable. As such, multiple inks of the same color may be included, where each of the inks has a different pigment loading. It is to be further understood that the pigment used in different shades may be the same or different. Furthermore, one or more dilutions of any of the colored inks may be included. In some examples, the inkjet ink set described herein further comprises a violet ink comprising a violet pigment. In some other examples, the inkjet ink set described herein further comprises a green ink comprising a green pigment. In yet some other examples, the inkjet ink set described herein further comprises an orange ink comprising an orange pigment.

In some examples, the system for printing an ink set according to the present disclosure may further comprise a first ink chamber including a black ink with a black pigment, a second ink chamber including a yellow ink with a yellow pigment; a third ink chamber including a cyan ink with a cyan pigment; a fourth ink chamber including a magenta ink with a magenta pigment, a fifth ink chamber including a white ink with a white pigment wherein at least one of the ink further contains a latex binder that is dispersed in the ink vehicle, and that includes a first heteropolymer including two or more aliphatic (meth)acrylate ester monomers or two or more aliphatic (meth)acrylamide monomers; and a second heteropolymer including a cycloaliphatic monomer and an aromatic monomer.

In some other examples, the system for printing an ink set can further include a sixth ink chamber including an ink that including a pigment which is selected from the group consisting of green, orange and purple pigments. In yet some other examples, the system for printing an ink set further includes multiples ink chambers including one or more ink each comprising pigment selected from the group consisting of green, orange and purple pigments.

Method of Printing

Also disclosed herein in a method of inkjet printing that utilizes the inkjet ink set disclosed herein. The method of printing may include inkjet printing at least on inkjet ink composition contained in the inkjet ink set, as described herein, onto a print substrate to form an inkjet ink layer on the print substrate. In some examples, the method of producing images on media, comprises providing a print media substrate; providing an ink set including a black ink with a black pigment, a yellow ink with a yellow pigment, a cyan ink with a cyan pigment, a magenta ink with a magenta pigment and, a white ink with a white pigment wherein at least one of the ink further contains a latex binder that is dispersed in the ink vehicle, and that includes a first heteropolymer including two or more aliphatic (meth)acrylate ester monomers or two or more aliphatic (meth)acrylamide monomers; and a second heteropolymer including a cycloaliphatic monomer and an aromatic monomer; and inkjet printing at least one ink composition from the ink set to the print substrate to form an ink layer disposed on print media substrate.

The printable medium or media or substrate that will be printed may be any type of printable media. However, in some examples, the printable media used in the printing method described herein is a non-porous printing substrate. Indeed, the inkjet ink set and the ink composition comprised in it, such as described herein, are specialty well adapted to be used on non-porous substrate media. In some other examples, the inkjet ink set and the ink composition comprised in it are specialty well adapted to flexible or to rigid non-porous media substrate. Thus, in some examples, the media used in the printing method described herein is non-porous print substrate. In some other examples, the media used in the printing method are low energy surface media. In yet some other examples, the media used in the printing method are flexible non-porous media or rigid non-porous media.

The non-porous print substrate or non-porous substrate used herein refers to media substrate with surfaces that have relatively poor water permeability and absorption. Vinyl, polypropylene, polyethylene and other plastic sheets or films, metals, coated offset media, glass, certain woods, and other similar substrates are considered to be non-porous. The term "non-porous media" refers to print media which has a Bristow Test of less than 2 ml/m2 at a contact time of less than 0.5 s. The Bristow Test is known in the art and is summarized below. A test specimen of defined dimensions is affixed to the smooth rim of a wheel free to rotate at a defined constant speed in contact with a stationary test fluid applicator pressing against the test specimen with a defined pressure. The test fluid applicator consists of a test solution storage compartment affixed above a 1 by 15-mm test fluid delivery slot, the slot being positioned so that the long dimension is perpendicular to the direction of rotation of the rim of the wheel, and parallel to the wheel axis. A defined quantity of test fluid is placed through the fluid reservoir, onto the fluid delivery slot. With the wheel with the test specimen affixed rotating at constant speed, the test solution applicator is brought into contact with the rotating test specimen and held in place under defined pressure. The test fluid is transferred from the test solution applicator onto the test specimen in a band whose width, controlled by the applicator slot width is approximately 15 mm, and whose length is function of the absorptive characteristics of the test fluid interaction with the test specimen under the defined test conditions. The amount of liquid absorbed per unit area of test specimen is calculated from the volume of test fluid originally placed in the applicator, and the average width and length of the band created on the test specimen by the transferred test fluid. The time available for the liquid absorption is calculated from the volume of test fluid originally placed in the applicator and applicator geometry.

Low energy surface media include polyolefinic media (polypropylene or polyethylene). These media may be factory modified to facilitate wetting by inks (e.g. aqueous inkjet inks); generally, this modification increases the surface energy, but relative to other substrates they remain 'low'. Surface energy, for example surface energy with respect to aqueous inks, may be measured by contact angle between the substrate and water. In some examples, a low energy surface media is a media (i.e. print substrate) having a surface energy of less than about 40 dyne/cm, for example less than about 35 dyne/cm. The surface energy of a print substrate may be measured according to ASTM D2578.

As used herein, the term "flexible non-porous media" refers to a medium that can be fed from a roll without cracking, breaking, ripping, etc. In an example, the flexible non-porous media may be fed from one media roll through the printer to another media roll (e.g., a take-up roll). Examples of the flexible non-porous media include self-adhesive vinyl (SAV, which is a plasticized poly(vinyl chloride) (PVC) often used in vehicle wraps, examples of which include 3M IJ180c Controltac cast SAV, Avery MPI 1005 cast SAV, and Avery MPI 2903 calendared SAV), polyethylene terephthalate (PET), synthetic paper (also known as "plastic paper", which includes compounded polypropylene, examples of which are commercially available from Yupo Corp.), etc. The soft polymer composition in the polymer particles disclosed herein is able to adhere to flexible non-porous media. As such, a printed image formed from an ink including the polymer particles is at least substantially resistant to flaking (i.e., ink chipping-off of the media, e.g., when exposing to creasing, bending, etc.).

Also, as used herein, the term "rigid non-porous media" refers to a medium that is commonly pre-cut to a size that may then be fed through a printer or that may rest on a flat supporting structure or bed while a printing module scans across the surface while applying ink by a digital means (e.g., pen or inkjet module). Rigid media may show indications of flexibility, but generally cannot be fed from a roll without cracking, breaking, ripping, etc. Examples of the rigid non-porous media include polypropylene, acrylics, polycarbonate, coated aluminum with a polyethylene (PE) core, wood, glass, etc. Examples of polypropylene include IntePro® Fluted Polypropylene, Coroplast® Corrugated Plastic Sheets, Correx Fluted Display Board, and BiPrint® corrugated sheets.

EXAMPLES

Ingredients

TABLE 3

| Ingredient name | Nature of the ingredient | Supplier |
| --- | --- | --- |
| Joncryl ® 671 | dispersants | BASF |
| Joncryl ® 683 | dispersants | BASF |
| BYK ®2105 | dispersants | BYK Chemie |
| BYK ® 190 | dispersants | Lubrizol Corporation |
| Carbosperse ® K-7028 | dispersants | Lubrizol Corporation |
| 1,2-Butanediol | Co-solvent (170° C. ≤ BP ≤ 215° C.) | Kowa |
| 2-pyrrolidone | Co-solvent (220° C. ≤ BP ≤ 285° C.) | BASF |
| Dowanol ® TPM | Co-solvent (220° C. ≤ BP ≤ 285° C.) | Dow Chemical Company |
| Dowanol ® TPnB | Co-solvent (220° C. ≤ BP ≤ 285° C.) | Dow Chemical Company |
| Tergitol ® 15-S-7 | Surfactants | Dow Chemical Company |
| Capstone ® FS-35 | Surfactants | Sasol Germany |
| Dispal ® 23N4-80 | Alumina Dispersion | Sasol |
| Crodafos ® O3A | Phosphate Ester | Croda |

Example 1: Latex Binder

Two examples of latex binder were prepared (latex binder I and latex binder II). The polymer particles of example I were formed with two different streams of monomers. One monomer stream included a solution of soft component monomers (i.e., monomers suitable for forming the first heteropolymer composition disclosed herein), and the other monomer stream included an emulsion of several hard and/or hydrophobic component monomers and an additional monomer (i.e., monomers suitable for forming the second heteropolymer composition disclosed herein). The latex particles of example I were prepared as follows. Deionized water (58.6 g) was heated to 77° C. with mechanical agitation in a reactor. At 77° C., latex seed (5.0 g at 49% solids; 67 nm particle size) was added to the reactor. Also at 77° C., potassium persulfate (0.2 g) dissolved in water (4% solution) was added. Three streams were added to the reactor: (A) a monomer solution including methyl methacrylate (12.1 g), butyl acrylate (22.4 g), and methacrylic acid (0.54 g); (B) a solution of copolymerizable surfactant (Hitenol® AR-1025) (1.75 g) dissolved in water (5.0 g); and (C) a solution of potassium persulfate (0.2 g) dissolved in water (10.0 g). Streams (A) and (B) were added over 105 minutes. Stream (C) was initiated with streams (A) and (B), but with a targeted feed time of 360 minutes. When streams (A) and (B) were completed, the reaction was held at 77° C. for one hour (stream (C) continued to feed during this time). After the one hour period, a new feed (D) was fed over 195 minutes. Feed (D) included an aqueous emulsion of water (30 g), copolymerizable surfactant (Hitenol® AR-1025) (7.0 g), cyclohexyl methacrylate (45.1 g), cyclohexyl acrylate (6.5 g), phenoxyethyl methacrylate (9.1 g), and methacrylic acid (2.6 g). Residual monomer was reduced by adding cyclohexyl acrylate (0.92 g) after increasing the temperature to 85° C. The temperature was held at 85° C. for one hour, followed by the addition of a 5% solution of ascorbic acid (4.2 g) and a 5% solution of tert-butyl hydroperoxide (8.4 g) at 70° C. After cooling to near ambient temperature, the pH was adjusted to 8 with dilute potassium hydroxide; and inkjet suitable aqueous biocides were added. The resulting polymer particles included two heteropolymer phases—one of methyl methacrylate, butyl acrylate, and methacrylic acid and the other of cyclohexyl methacrylate, cyclohexyl acrylate, phenoxyethyl methacrylate, and methacrylic acid. The example polymer particles were present in an emulsion (i.e., a latex emulsion), and made up 42.4% solids by total weight of the latex emulsion. The particle size of the example polymer particles was 0.215 μm (particle size determined using Microtrac Nanotrac Wave II), and the viscosity (at 25° C.) of the latex emulsion was less than 50 cps.

Example 2: Ink Set Ink and Ink Compositions

Different inkjet ink compositions are prepared with the components and the amounts as listed in Table 4. Example inkjet inks compositions according to the present disclosures were formulated with the latex binder particles of examples I and II. Each number represents the wt % of each component present in the example (with respect to the total weight of the respective ink composition). The pH is adjusted by addition of KOH to achieve a pH of about 8.5.

All inkjet ink compositions are then loaded into an ink set. Ink 1 is a black ink composition comprising a back pigment; Ink 2 is a cyan ink composition comprising a cyan pigment; Ink 3 is a magenta ink composition comprising a magenta pigment; Ink 4 is a yellow ink composition comprising a yellow pigment; Ink 5 is a white ink composition comprising a white pigment.

The white pigment present in the white ink is an alumina and silica coated white pigment that is commercially available from Chemours under the Trade name Ti-Pure® R-960 (The wt % of the pigment represents the percentage of the solid pigment particles.) The alumina dispersion, present in the white ink, is made in a 10 wt % suspension with water. The alumina (Boehmite Amphoteric Alumina Particles (50 nm) is obtained from Sasol, under the tradename Dispal® 23N4-80 which comes as a dry powder. This dispersion is pre-neutralized with nitric acid (by Sasol) so the powder will disperse easily when mixed with water.

TABLE 4

| Ingredients | Ink 1 | Ink 2 | Ink 3 | Ink 4 | Ink 5 |
|---|---|---|---|---|---|
| Black Pigments | 2.60 | — | — | — | — |
| Cyan Pigments | — | 7.70 | — | — | — |
| Yellow Pigments | — | — | — | 3.90 | — |
| Magenta Pigments | — | — | 3.50 | — | — |
| White Pigments | — | — | — | — | 11.3 |
| Joncryl ® 671 | 0.70 | — | — | — | — |
| Joncryl ® 683 | — | — | — | 0.46 | — |
| BYK ®2105 | — | — | — | 0.80 | — |
| BYK ®-190 | — | — | — | — | 0.09 |
| Carbosperse ® K-7028 | — | — | — | — | 0.06 |
| Latex I from example 1 | 10.0 | 10.0 | 10.0 | 10.0 | 9.70 |
| 1,2-Butanediol | 18.0 | 18.0 | 18.0 | 15.0 | 14.3 |
| 2-pyrrolidone | 5.00 | 3.00 | 3.00 | 3.00 | 2.80 |
| Dowanol ® TPM | 2.00 | 2.00 | 2.00 | 2.00 | 1.80 |
| Dowanol ® TPnB | — | — | — | — | 0.30 |
| Crodafos ® O3A | 0.50 | 0.35 | 0.35 | 0.35 | — |
| Tergitol ® 15-S-7 | 0.20 | 0.20 | 0.20 | 0.20 | 0.40 |
| Capstone ® FS-35 | 0.40 | 0.40 | 0.40 | 0.40 | 0.30 |
| Dispal ® 23N4-80 | — | — | — | — | 0.30 |
| Water | balance | balance | balance | balance | balance |

Example 3: Inkjet Ink Set Performances

The ink set comprising the ink compositions 1 to 5 were printed on flexible media (self-adhesive vinyl (SAV) and polyethylene terephthalate (PET)) and rigid media (polypropylene). The resulting printed articles were exposed to several different tests. The inks were tested for color retention and substrate adhesion performances.

The ink set comprising, with the ink compositions 1 to 5, was thermal inkjet printed on 3M IJ180c Controltac cast SAV, cured, and dried. The printed samples were 150 mm×20 mm color swatches. The printed samples were then stretched on an Instron tester at 300 mm/minute. The printed samples were run at 0%, 15%, 30%, 60% and 90% elongation. For example, at 90% elongation, the printed sample was elongated from 150 mm to 285 mm. L*a*b* was measured at 5 locations along each printed sample both before and after elongation. The change in color (ΔE from Lab measurements relative to the un-stretched sample) was then plotted versus Media Elongation Percentage. The results demonstrated that the tested inks showed good performance in term of in terms of color retention on flexible media after elongation.

The ink set comprising, with the ink compositions 1 to 5, was thermal inkjet printed on rigid, fluted polypropylene (i.e., IntePro® Fluted Polypropylene), cured and dried. The printed samples were then tested for adhesion. A cross hatch tape adhesion test was carried out as defined in ASTM D3359 09, except that Intertape Polymer Group® 515965 tape was used in place of Permacel® P99 test tape. The tested ink showed excellent adhesion (Printed Ink Removal performance) since 0% of the printed ink was removed.

The invention claimed is:

1. An inkjet ink set comprising:
a black ink with a black pigment,
a yellow ink with a yellow pigment,
a cyan ink with a cyan pigment,
a magenta ink with a magenta pigment and,
a white ink with a white pigment,
wherein at least one of the inks further contains a latex binder that is dispersed in an ink vehicle, and that includes:
a first heteropolymer including two or more aliphatic (meth)acrylate ester monomers or two or more aliphatic (meth)acrylamide monomers; and
a second heteropolymer including a cycloaliphatic monomer and an aromatic monomer, wherein the aromatic monomer is selected from the group consisting of an aromatic (meth)acrylate monomer and an aromatic (meth)acrylamide monomer.

2. The inkjet ink set of claim 1 wherein, in at least one of the inks, the latex binder is present in an amount ranging from about 5 wt% to about 35 wt% of a total weight of the at least one of the inks.

3. The inkjet ink set of claim 1 wherein, in at least one of the inks, the cycloaliphatic monomer of the second heteropolymer of the latex binder is selected from the group consisting of a cycloaliphatic (meth)acrylate monomer and a cycloaliphatic (meth)acrylamide monomer.

4. The inkjet ink set of claim 1 wherein, in at least one of the inks, in the latex binder, the first heteropolymer is present in an amount ranging from about 15 wt% to about 70 wt% of a total weight of the latex binder; and the second heteropolymer is present in an amount ranging from about 30 wt% to about 85 wt% of the total weight of the latex binder.

5. The inkjet ink set of claim 1 wherein, in at least one of the inks, in the first heteropolymer of the latex binder, the two or more aliphatic (meth)acrylate ester monomers are linear aliphatic (meth)acrylate ester monomers, cycloaliphatic (meth)acrylate ester monomers, or combinations thereof; or the two or more aliphatic (meth)acrylamide monomers are selected from the group consisting of $C_1$ to $C_8$ alkyl acrylamide monomers and $C_1$ to $C_8$ alkyl methacrylamide monomers.

6. The inkjet ink set of claim 1 wherein, in at least one of the inks, the ink vehicle further includes co-solvent.

7. The inkjet ink set of claim 1 wherein, in at least one of the inks, the ink vehicle includes water and a co-solvent, the co-solvent being a blend including a solvent having a boiling point ranging from about 170° C. to about 215° C. and a solvent having a boiling point of about 220° C. or more.

8. The inkjet ink set of claim 1 wherein, in at least one of the inks, the ink vehicle further includes surfactants.

9. The inkjet ink set of claim 1 wherein the pigment of the white ink is a white metal oxide pigment that has an average particle size ranging from about 200 nm to about 700 nm, and that includes titanium dioxide particles, zinc oxide particles, zirconium oxide particles, or combinations thereof.

10. The inkjet ink set of claim 1 wherein the pigment of the white ink is white metal oxide pigment that has an alumina coating which is made of alumina or of an admixture of alumina and silica.

11. The inkjet ink set of claim 1, wherein the white ink includes:
from 0.2 wt% to 1.5 wt% of a monovalent metal salt; or
from 0.001 wt% to 0.3 wt% of a divalent metal salt; or
both the monovalent metal salt and the divalent metal salt.

12. The inkjet ink set of claim 1, wherein the white ink includes from 0.05 wt% to 0.5 wt% of amphoteric alumina particles dispersed in the ink vehicle.

13. A method of producing images comprising:
providing a print media substrate;
providing an ink set including a black ink with a black pigment, a yellow ink with a yellow pigment, a cyan ink with a cyan pigment, a magenta ink with a magenta pigment and, a white ink with a white pigment wherein at least one of the inks further contains a latex binder that is dispersed in an ink vehicle, and that includes:

a first heteropolymer including two or more aliphatic (meth)acrylate ester monomers or two or more aliphatic (meth)acrylamide monomers; and a second heteropolymer including a cycloaliphatic monomer and an aromatic monomer, wherein the aromatic monomer is selected from the group consisting of an aromatic (meth)acrylate monomer and an aromatic (meth)acrylamide monomer;

and inkjet printing at least one ink composition from the ink set to the print substrate to form an ink layer disposed on print media substrate.

14. The method of printing of claim 13 wherein the print media substrate is a non-porous printing substrate.

15. A system for printing an ink set comprising:

an ink set, comprising a black ink with a black pigment, a yellow ink with a yellow pigment, a cyan ink with a cyan pigment, a magenta ink with a magenta pigment and a white ink with a white pigment wherein at least one of the inks further contains a latex binder that is dispersed in an ink vehicle, and that includes a first heteropolymer including two or more aliphatic (meth)acrylate ester monomers or two or more aliphatic (meth)acrylamide monomers; and a second heteropolymer including a cycloaliphatic monomer and an aromatic monomer, wherein the aromatic monomer is selected from the group consisting of an aromatic (meth)acrylate monomer and an aromatic (meth)acrylamide monomer; and an inkjet printer having the ink set loaded therein.

16. The system for printing an ink set according to claim 15, wherein the inkjet printer further comprises:
a first ink chamber including the black ink,
a second ink chamber including the yellow ink,
a third ink chamber including the cyan ink,
a fourth ink chamber including the magenta ink,
a fifth ink chamber including the white ink.

* * * * *